(12) United States Patent
Fu et al.

(10) Patent No.: US 11,706,485 B2
(45) Date of Patent: Jul. 18, 2023

(54) DISPLAY DEVICE AND CONTENT RECOMMENDATION METHOD

(71) Applicant: Hisense Visual Technology Co., Ltd., Qingdao (CN)

(72) Inventors: Yansong Fu, Qingdao (CN); Wenqin Yu, Qingdao (CN); Zhiqiang Li, Qingdao (CN); Yazhou Meng, Qingdao (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 35 days.

(21) Appl. No.: 17/350,614

(22) Filed: Jun. 17, 2021

(65) Prior Publication Data

US 2021/0314668 A1 Oct. 7, 2021

Related U.S. Application Data

(63) Continuation of application No. PCT/CN2020/085559, filed on Apr. 20, 2020.

(30) Foreign Application Priority Data

Jun. 10, 2019 (CN) .......................... 201910498161.0
Aug. 19, 2019 (CN) .......................... 201910766057.5

(51) Int. Cl.
*H04N 21/466* (2011.01)
*G06K 9/00* (2022.01)
(Continued)

(52) U.S. Cl.
CPC ..... *H04N 21/4415* (2013.01); *G06V 10/7784* (2022.01); *G06V 40/172* (2022.01);
(Continued)

(58) Field of Classification Search
CPC ........... H04N 21/4223; H04N 21/4312; H04N 21/4415; H04N 21/44213;
(Continued)

(56) References Cited

U.S. PATENT DOCUMENTS

| | | | |
|---|---|---|---|
| 2006/0044446 A1* | 3/2006 | Porter .................. | G11B 27/034 |
| 2009/0133051 A1* | 5/2009 | Hildreth ........... | H04N 21/42204 |
| | | | 725/28 |

(Continued)

FOREIGN PATENT DOCUMENTS

| | | |
|---|---|---|
| CN | 102740060 A | 10/2012 |
| CN | 103324729 A | 9/2013 |

(Continued)

OTHER PUBLICATIONS

Chinese Office Action, dated Aug. 2, 2022, from Chinese Patent Application No. 201910766057.5.

*Primary Examiner* — Rong Le
(74) *Attorney, Agent, or Firm* — Workman Nydegger

(57) ABSTRACT

This disclosure can provide a display device and a display method. The display device includes at least one camera configured to capture an environmental scenario image; a display configured to display a user interface; a controller in communicated with the display, configured to receive a command, input by a user, for obtaining a content recommendation resource associated with content currently displayed in the user interface; determine whether an application corresponding to the content currently displayed in the user interface is an application invoking the at least one camera, and if yes, display a first user interface, where the first user interface displays a first image captured by the at least one camera.

8 Claims, 11 Drawing Sheets

(51) Int. Cl.
*H04N 5/445* (2011.01)
*H04N 5/232* (2006.01)
*H04N 21/431* (2011.01)
*H04N 21/4223* (2011.01)
*H04N 21/442* (2011.01)
*H04N 21/4415* (2011.01)
*G06V 40/16* (2022.01)
*H04N 23/60* (2023.01)
*G06V 10/778* (2022.01)

(52) U.S. Cl.
CPC ............ *G06V 40/174* (2022.01); *H04N 5/445* (2013.01); *H04N 21/4223* (2013.01); *H04N 21/4312* (2013.01); *H04N 21/44213* (2013.01); *H04N 21/4668* (2013.01); *H04N 23/60* (2023.01)

(58) Field of Classification Search
CPC ......... H04N 21/44218; H04N 21/4668; H04N 5/232; H04N 5/23219; H04N 5/23293; H04N 5/445; H04N 7/18
See application file for complete search history.

(56) References Cited

U.S. PATENT DOCUMENTS

2009/0138805 A1* 5/2009 Hildreth ............ H04N 21/4751 715/745
2010/0251298 A1* 9/2010 Brown ............... H04N 21/4316 725/39
2011/0007141 A1 1/2011 Hirano
2014/0359647 A1* 12/2014 Shoemake ......... H04N 21/6582 725/10
2015/0082330 A1 3/2015 Yun et al.
2016/0366203 A1* 12/2016 Blong .................. H04L 65/612

FOREIGN PATENT DOCUMENTS

| | | |
|---|---|---|
| CN | 104320708 A | 1/2015 |
| CN | 104520842 A | 4/2015 |
| CN | 104598869 A | 5/2015 |
| CN | 104754413 A | 7/2015 |
| CN | 105761120 A | 7/2016 |
| CN | 105872402 A | 8/2016 |
| CN | 106303628 A | 1/2017 |
| CN | 106973327 A | 7/2017 |
| CN | 107818110 A | 3/2018 |
| CN | 107948743 A | 4/2018 |
| CN | 108055589 A | 5/2018 |
| CN | 108156522 A | 6/2018 |
| CN | 108259973 A | 7/2018 |
| CN | 109121007 A | 1/2019 |
| CN | 109257640 A | 1/2019 |
| CN | 109327737 A | 2/2019 |
| CN | 109462765 A | 3/2019 |
| CN | 208938000 U | 6/2019 |

* cited by examiner

DISPLAY DEVICE AND CONTENT RECOMMENDATION METHOD

CROSS-REFERENCE TO RELATED APPLICATIONS

The present application is a continuation of International Application No. PCT/CN2020/085559 filed Apr. 20, 2020, which claims priority to Chinese Patent Application No. 201910498161.0 filed Jun. 10, 2019 and Chinese Patent Application No. 201910766057.5 filed Aug. 19, 2019. The entire disclosures of the above applications are incorporated herein by reference.

FIELD

The present disclosure relates to display technology, and in particular to a display method and a display device with a camera.

BACKGROUND

This section provides background information related to the present disclosure which is not necessarily prior art.

At present, since the display devices can provide users with play functions such as audio, video, image, etc., they receive wide attention from users. With the developments of big data and artificial intelligence, the users' demands for the functions of display devices are increasing day by day. For example, if it is determined that a user is a senior citizen through face recognition, the health associated programs as well as old fashioned music, videos and other resources with a sense of time will be pushed; or, if it is determined that the user's mood is low through face recognition, the comedy videos and music with lively rhythms or the like can be pushed. However, the current display devices, especially household devices, such as smart TVs, cannot realize the above scenarios because they have no built-in camera. Therefore, there is an urgent need for a display device that can push the content recommendation information associated with the facial feature information while presenting traditional TV images to provide users with intelligent services and improve user experience.

SUMMARY

This section provides a general summary of the disclosure, and is not a comprehensive disclosure of its full scope or all of its features.

In a first aspect, the present disclosure provides a display device, comprising:

at least one camera configured to capture an environmental scene image;

a display configured to display a user interface, wherein the user interface is configured to present content of a camera-related application or web media content;

a controller in communication with the display, configured to:

receiving a command for obtaining a content recommendation resource associated with content currently displayed in the user interface input from a user; determining whether an application corresponding to the content currently displayed in the user interface is an application invoking the at least one camera, and in response to the application corresponding to the content currently displayed in the user interface being the application invoking the at least one camera, display a first user interface, where the first user interface displays a first image captured by the at least one camera.

In a second aspect, the present disclosure further provides a display method, comprising:

capturing an environmental scene image;

displaying a user interface, where the user interface is configured to present content of a camera related application or web media content;

receiving a command for obtaining a content recommendation resource associated with content currently displayed in the user interface input from a user; and determining whether an application corresponding to the content currently displayed in the user interface is an application invoking the at least one camera, and in response to the application corresponding to the content currently displayed in the user interface being the application invoking the at least one camera, displaying a first user interface, where the first user interface displays a first image captured by the at least one camera.

In a third aspect, the present disclosure further provides a display device, comprising:

a camera configured to collect the environmental scene data;

a display configured to display a user interface, where the user interface presents the camera-related application content that includes at least a first face;

a controller in communication with the display, configured to present the user interface:

in response to a command for obtaining recommendation associated with content currently presented on the display, presenting a first user interface, where the first user interface includes an information display area, and the information display area shows recommendation information associated with a first face.

In a fourth aspect, the present disclosure further provides a method for content recommendation associated with currently displayed content. This method is applied to a display device with at least one camera, and comprises:

presenting a user interface on a display, where the user interface is used to present the camera-related application content;

in response to a command for obtaining recommendation associated with content currently presented on the display input from a user, presenting a first user interface, where the first user interface includes an information display area, and the information display area displays information associated with a first face recognized in a first image.

In a fifth aspect, the present disclosure further provides a display device, comprising:

a camera configured to collect the environmental scene data;

a display configured to display a first user interface, where the first user interface includes an image display area and an information display area, the information display area is displayed above the image display area, the image display area displays a first image associated with the environment scene data, the first image includes at least a first face and a second face, and the information display area displays at least thumbnails of the first face and the second face and recommendation information associated with the first face;

the information display area further includes a focus that indicates that a face thumbnail is selected and is used to mark the thumbnail of the first face, and the position of the focus in the information display area can be moved by a user input to select a thumbnail of a different face;

a controller in communication with the display, configured to present the user interface:

in response to a focus switch operation for moving the thumbnail of the first face to the thumbnail of the second face, updating the information display area to display the recommendation information associated with the second face;

if the position of the second face in the image display area is located in an area covered by the information display area, moving the second face out of the area covered by the information display area.

In a sixth aspect, the present disclosure further provides a method for content recommendation associated with content currently presented on the screen. The method is applied to a display device and includes:

receiving a command for launching a camera, and presenting a preview window associated with the environment scene data obtained from the camera on a display of the display device;

in response to a command for obtaining recommendation associated with content currently presented on the display, presenting a first user interface on the display, where the first user interface includes an image display area and an information display area, the information display area is displayed above the image display area, the image display area displays a first image associated with the environmental scene data, the first image includes at least a first face and a second face, and the information display area displays a first thumbnail of the first face and a second thumbnail of the second face and the recommendation information associated with the first face;

the information display area further includes a focus that indicates that the face thumbnail is selected and is used to mark the thumbnail of the first face, and the position of the focus in the information display area can be moved by a user input to select a thumbnail of a different face;

in response to a focus switch operation for switching from the first thumbnail to the second thumbnail, updating the information display area to display the recommendation information associated with the second face;

if the position of the second face in the image display area is located in an area covered by the information display area, moving the second face out of the area covered by the information display area.

In a seventh aspect, the present disclosure further provides a display device, comprising:

a display;

a camera configured to collect the environment scene data;

a controller in communication with the display, configured to present the user interface:

while presenting the environment scene data collected by the camera on the display, presenting a first user interface in response to a command for obtaining the recommendation associated with content currently presented on the display, where the first user interface includes a first face thumbnail of a first face in the environment scene data collected by the camera;

in response to a user input for selecting the first face thumbnail, presenting the recommendation information associated with the first face thumbnail on the display.

In an eighth aspect, the present disclosure further provides a method for recommendation associated with content currently presented on the display. This method is applied to a display device with at least one camera, and comprises:

while presenting the environment scene data collected by the camera on the display, presenting a first user interface in response to a command for obtaining recommendation associated with content currently presented on the display, where the first user interface includes a first thumbnail of a first face in the environment scene image data collected by the at least one camera; in response to a user input for selecting the first thumbnail, presenting the recommendation information associated with the first thumbnail on the display.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

The terms involved in the present disclosure will be described below with reference to the drawings. It should be pointed out here that the following description of all the terms is only to make the content of the present disclosure easier to be understood, and does not intend to limit the protection scope of the present disclosure.

The term "module" used in the embodiments of the present disclosure may refer to any known or later developed hardware, software, firmware, artificial intelligence, fuzzy logic, or combination of hardware or/and software codes that can perform the relevant function.

The term "remote controller" used in the embodiments of the present disclosure refers to a component of an electronic device (such as the display device disclosed in the present disclosure), which can generally control the electronic device wirelessly within a relatively short distance range. This component may generally be connected to the electronic device by using at least one of infrared ray, Radio Frequency (RF) signal, Bluetooth and other communication methods, and may also include WiFi, wireless Universal Serial Bus (USB), Bluetooth, motion sensor and other functional modules. For example, this component is a handheld touch remote controller, which uses the user interface in the touch screen to replace most of the physical built-in hard keys in the general remote control device.

The term "gesture" used in the embodiments of the present disclosure refers to a user behavior for expressing the expected thought, action, purpose or result through the change in hand shape or the hand movement or other actions.

The term "hardware system" used in the embodiments of this disclosure may refer to an entity component that is composed of mechanical, optical, electrical and magnetic devices such as Integrated Circuit (IC), Printed Circuit Board (PCB) or the like and has the computing, control, storage, input and output functions. In various embodiments of the present disclosure, the hardware system may usually also be called motherboard or chip.

Figure 1:
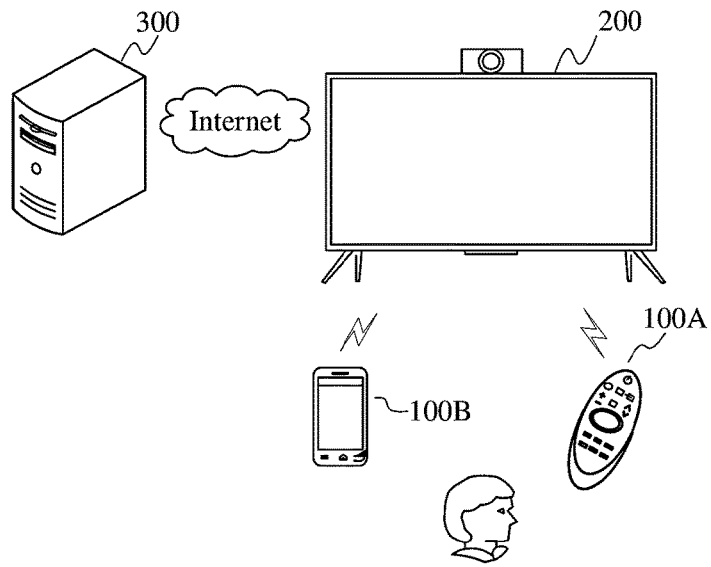
FIG. 1 is a schematic diagram of an operation scenario between a display device and a control device according to an embodiment of the present disclosure.

FIG. 1 exemplarily shows a schematic diagram of an operation scenario between a display device and a control device according to an embodiment. As shown in FIG. 1, a user may operate a display device 200 through a control device (100A, 100B).

Here, the control device may be a remote controller 100A, which may communicate with the display device 200 through the infrared protocol, Bluetooth protocol, ZigBee protocol or other short-range communication method, to control the display device 200 wirelessly or by other wired methods. The user may input user commands via keys on the remote controller, voice inputs, control panel inputs, etc. to control the display device 200. For example, the user may input the corresponding control commands through the volume up/down keys, channel control keys, up/down/left/right directional keys, voice input keys, menu key, on/off key, etc. on the remote controller to control the functions of the display device 200.

The control device may also be a smart device, or may be the mobile terminal 100B, tablet computer, computer, laptop, etc., which may communicate with the display device 200 through a Local Area Network (LAN), a Wide Area Network (WAN), a Wireless Local Area Network (WLAN) or other networks, and implement the control of the display device 200 through an application program corresponding to the display device 200. For example, an application running on the smart device is used to control the display device 200, and this application may provide the user with various controls through an intuitive User Interface (UI) on the screen associated with the smart device.

Exemplarily, both the mobile terminal 100B and the display device 200 can install software applications, so that the connection and communication between them may be achieved through the network communication protocols, thereby achieving the purpose of one-to-one control operation and data communication. For example, a control command protocol may be established between the mobile terminal 100B and the display device 200, where the remote control keyboard is synchronized onto the mobile terminal 100B, and the function of controlling the display device 200 is realized by controlling the user interface on the mobile terminal 100B; and the audio and video content displayed on the mobile terminal 100B may also be transmitted to the display device 200 to realize the synchronous display function.

As shown in FIG. 1, the display device 200 may further perform the data communication with a server 300 through various communication methods. In various embodiments of the present disclosure, the display device 200 may communicatively connected to the server 300 through the local area network, wireless local area network, or other networks. The server 300 may provide various contents and interactions to the display device 200.

Exemplarily, the display device 200 receives the software updates by sending and receiving the information and the Electronic Program Guide (EPG) interaction, or accesses a remotely stored digital media library. The server 300 may be one group or multiple groups of servers, and may be one or more types of servers. The server 300 provides the video on demand, advertising service and other network service content.

The display device 200 may be a liquid crystal display, an Organic Light Emitting Diode (OLED) display, a projection display device, or a smart TV. The type, size, resolution, etc. of the display device are not limited, and those skilled in the art may understand that some changes may be made in the performance and configuration of the display device 200 as needed.

In addition to the broadcast receiving TV function, the display device 200 may additionally provide smart network TV functions that usually support by computers. Exemplarily, it includes: network TV, smart TV, Internet Protocol Television (IPTV), etc.

As shown in FIG. 1, the display device 200 may be connected or provided with a camera for presenting captured images on the display interface of this display device or other display devices to realize the interactive chat between users, and face recognition, etc. Specifically, the image captured by the camera may be displayed in full screen, in half screen or in any selectable area on the display device.

As an exemplary embodiment, the camera is connected to the display rear shell through a connecting plate, and is fixedly installed on the middle of the upper side of the display rear shell. As an alternative for installation, it can be fixedly installed at any position of the display rear shell as long as it can be ensured that the image capture area is not blocked by the rear shell, for example, the image capture area and the display device have the same orientation.

As another exemplary embodiment, the camera is connected to the display rear shell through a connecting plate or other conceivable connector which allows to be lift up and lift down, where the connector is equipped with a motor for driving to lift up and lift down. When a user wants to use the camera or an application needs to use the camera, it is lifted above the display. When there is no need to use the camera, it can be embedded into the rear shell to protect the camera from damage.

For example, the camera used in the present disclosure may have 16 million pixels to achieve the purpose of ultra-high-definition display. In actual use, a camera with higher or lower than 16 million pixels can also be used.

When a camera is installed on the display device, the content displayed in different application scenarios of the display device can be combined in a variety of different ways to achieve functions that cannot be achieved by traditional display devices.

Exemplarily, a user can have a video chat with at least one other user while watching a video. The presentation of the video can be used as the background, with the video chat window displayed over this background. Visually, this function can be called "chatting while watching".

Alternatively, in the "chatting while watching" scenario, at least one video chat is performed across terminals while watching a live video or an online video.

In other embodiments, a user can have a video chat with at least one other user while entering an education application for learning. For example, a student can realize the remote interaction with teachers while learning the content in the education application. Visually, this function can be called "chatting while learning".

In other embodiments, a user have a video chat with players entering a card game when playing the game. For example, a player can realize the remote interaction with other players when entering the game application to participate in the game. Visually, this function can be called "play while watching".

Alternatively, the game scene is integrated with the video image, and the portrait in the video image is cut out and displayed in the game screen to improve the user experience.

Alternatively, in motion sensing games (such as ball games, boxing games, running games, dancing games, etc.), the camera is used to obtain the body postures and actions, detect and track the body, and detect the data of key points of skeletons, which are then combined with animations in the game to realize the game such as sport, dance, etc.

In other embodiments, the user can interact with at least one other user in video and voice in Karaoke application. Visually, this function can be called "singing while watching". Preferably, when at least one user enters the application in a chat scene, multiple users can join the recording of a song.

In other embodiments, the user can turn on the local camera to acquire images and videos. Visually, this function can be called "looking in the mirror". The user can turn on the camera of the display device through voice or remote control commands locally, and in response, the display device displays the captured images in real time. This function can be put into an application, and visually, this function can be called "mirror". The user acquires an image among the images captured by the camera in real time through the photo-taken operation, and the images captured by the camera in real time in the predefined duration can be acquired through the recording operation. Further, the mirror application can also provide the user with an information push function, that is, use the camera to acquire the user's facial information and push resources such as videos, pictures, music and books to the user based on this.

In other examples, more functions can be added or the aforementioned functions can be reduced. The present disclosure does not specifically limit the functions of the display device.

Figure 2A:
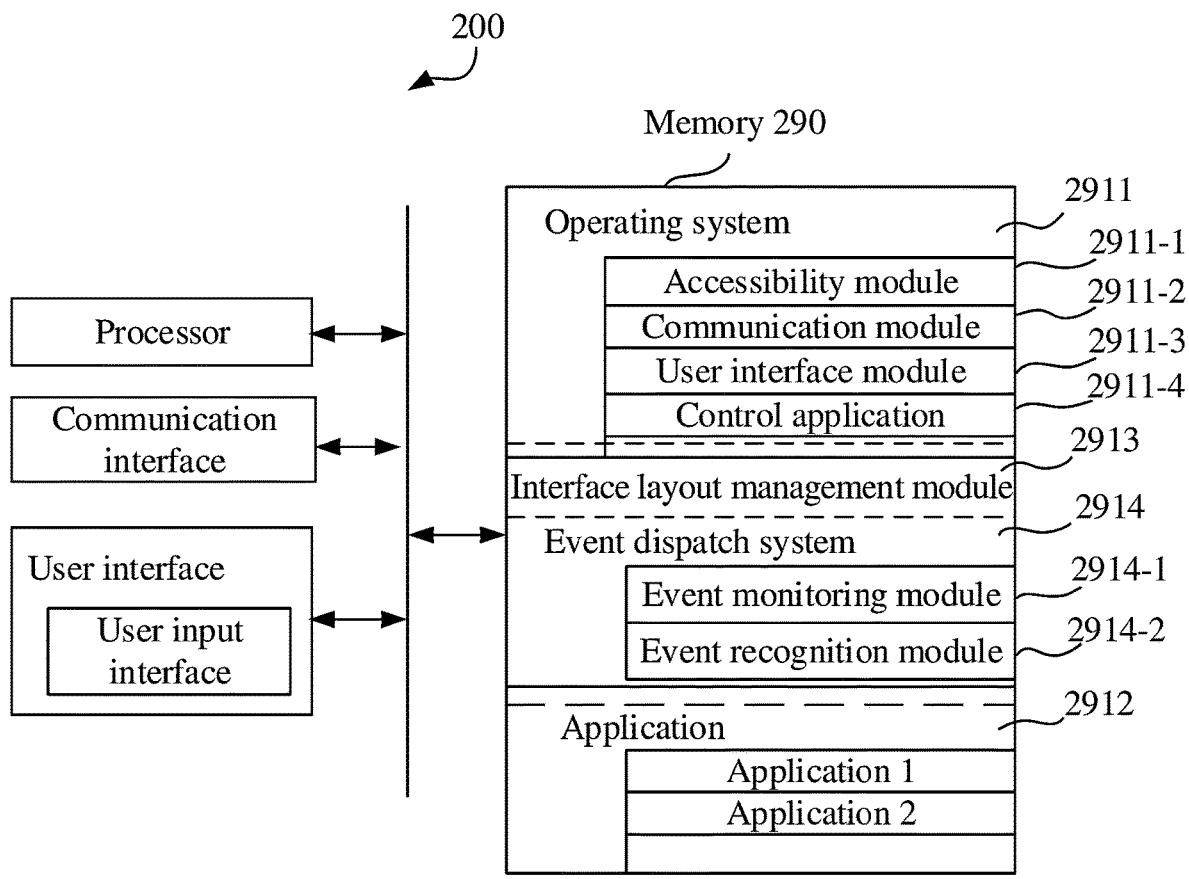
FIG. 2A is a configuration block diagram of a software system in the display device according to an embodiment of the present disclosure.

FIG. 2A exemplarily shows a configuration block diagram of a software system in the display device 200 according to an exemplary embodiment.

As shown in FIG. 2A, the operating system 2911 includes the execution operating software for processing various basic system services and implementing the hardware-related tasks, and serves as a medium completing the data processing between applications and hardware components.

In some embodiments, a part of the operating system kernel may include a series of software for managing the hardware resources of the display device and providing services to other applications or software codes.

In other some embodiments, a part of the operating system kernel may include one or more device drivers, which may be a set of software codes in the operating system and help to operate or control the devices or hardware associated with the display device. The drive may contain the codes operating the video, audio and/or other multimedia components. Exemplarily, a display, a camera, Flash, WiFi, and an audio driver are included.

Here, an accessibility module 2911-1 is configured to modify or access an application to realize the accessibility of the application and the operability of the display content thereof.

A communication module 2911-2 is configured to connect with other peripheral devices via the related communication interfaces and communication networks.

A user interface module 2911-3 is configured to provide an object displaying a user interface for each application to access, and may realize the user operability.

The "user interface" is a medium interface for interaction and information exchange between applications or operating systems and users. It realizes the conversion between the internal form of information and the form acceptable to users. The commonly-used form of the user interface is Graphic User Interface (GUI), which refers to a user interface related to computer operations that is displayed in a graphical manner. It may be an interface element such as icon, window, control or the like displayed in the display screen of an electronic device, wherein the controls may include icon, button, menu, tab, text box, dialog box, status bar, navigation bar, Widget, and other visual interface elements.

A control application 2911-4 is configured to control the process management, including the runtime application program, etc.

The event dispatch system 2914 can be implemented in the operating system 2911 or in the application 2912. In some embodiments, on the one hand, it is implemented in the operating system 2911, and simultaneously implemented in the application 2912. It is a processing configured to monitor various user input events and dispatch the recognition results in response to various types of events or sub-events according to various events to implement one or more sets of predefined operations.

Here, an event monitoring module 2914-1 is configured to monitor the events or sub-events input from the user input interface.

The event recognition module 2914-2 is configured to recognize various events or sub-events according to the definitions of various events input from various user input interfaces, and transmit them for processing to execute one or more groups of processing.

Here, the events or sub-events refer to the inputs detected by one or more sensors in the display device 200 and the inputs of the external control device (such as the control device 100, etc.), such as: various sub-events input via voice, gesture input sub-events recognized by gesture, and sub-events input via the remote-control keys of the control device, etc. Exemplarily, one or more sub-events in the remote controller include multiple forms, including but not limited to one or a combination of pressing the up/down/left/right key, pressing the OK key, pressing and holding the key and the like, as well as the operations of non-physical keys, such as moving, pressing, releasing, etc.

The interface layout management module 2913 directly or indirectly receives various monitored user input events or sub-events from the event dispatch system 2914, and is configured to update the layout of the user interface, including but not limited to the position of each control or sub-control in the interface, the size or position or level of the container, and various execution operations related to the interface layout.

Figure 2B:
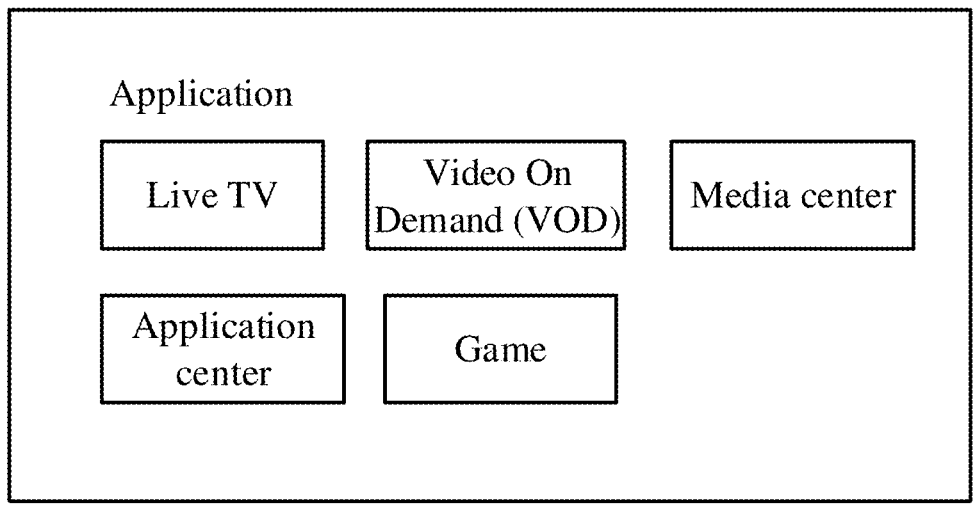
FIG. 2B is a schematic diagram of various applications executed in the display device according to an embodiment of the present disclosure.

As shown in FIG. 2B, the application layer of the display device contains various applications executed on the display device 200.

The application layer 2912 may include, but is not limited to, one or more applications, such as video-on-demand application, application center, game application, live TV application, media center application, etc. It should be noted that what application s are included in the application layer 2912 are determined according to the operating system and other designs. The present disclosure does not need to perform specific definitions and divisions on the applications included in the application layer 2912.

The live TV application may provide the live TV through different signal sources. For example, the live TV application may use the inputs from the cable television, wireless broadcast, satellite service, or other types of live TV services to provide television signals, and the live TV application may display the video of the live TV signals on the display device 200.

The video-on-demand application may provide videos from different storage sources. Unlike the live TV application, the video on demand provides the video display from certain storage sources. For example, the videos on demand may come from the server side of cloud storage, or from a local hard disk storage containing the stored video programs.

The media center application may provide various applications playing the multimedia content. For example, the media center may be different from the live TV or video on demand, and the user may access various services provided by images or audios through the media center application.

The application center may store various applications. The applications may be a game application or some other applications that are related to the computer system or other devices but may be run in the display device. The application center may obtain these applications from different sources, store them in the local storage, and then run them on the display device 200.

In some exemplary embodiments, in order to facilitate the user's use, reduce the load of the CPU and improve the data processing capability, the display device 200 may adopt a dual-hardware system architecture. One hardware system in the dual-hardware system architecture is called the first hardware system, and the other hardware system architecture is called the second hardware system. The first hardware system and the second hardware system may each be installed with independent operating systems, so that there are two independent but related subsystems in the display device 200. In this way, some functions can be allocated to the first hardware system for implementation, and other functions can be allocated to the second hardware system for implementation. The two hardware systems are respectively responsible for processing different data, and at the same time, can communicate with each other to achieve a certain function. For example, the first hardware system is used to implement traditional TV functions, and the second hardware system is used to implement the aforementioned mirror function. When receiving a command related to the mirror function, the first hardware system processes, such as decoding, if it is determined that this command is related to the mirror function that the second hardware system is responsible for, and then sends the processed command to the second hardware system, so that the second hardware system responds to this command.

It should be noted that the embodiments of the present disclosure may be implemented based on a single-hardware system, or may be implemented based on a dual-hardware system, which is not limited in the present disclosure.

Figure 3:
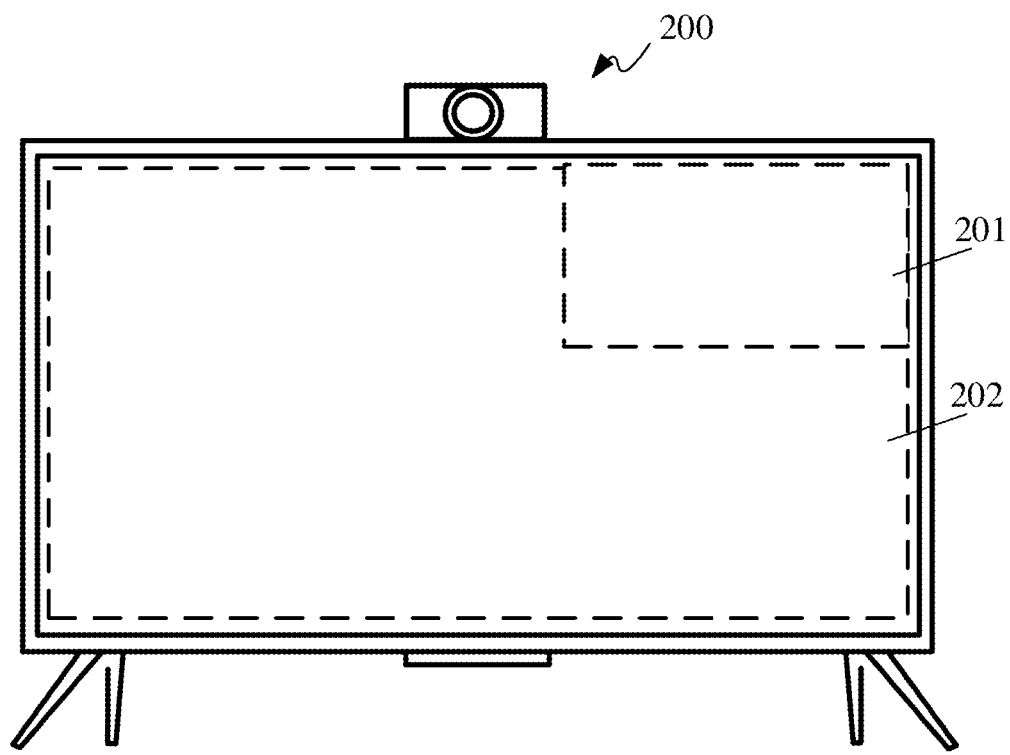
FIG. 3 is a schematic diagram of a user interface of the display device according to an embodiment of the present disclosure.

FIG. 3 exemplarily shows a schematic diagram of the user interface in the display device 200 according to an exemplary embodiment. As shown in FIG. 3, the user interface includes multiple view display areas, for example, a first view display area 201 and a second view display area 202, wherein the display screen includes one or more different items. And the user interface further includes a selector indicating that an item is selected, and the position of the selector can be moved by the user input to change the selection of different items.

It should be noted that multiple view display areas may present with different priorities. For example, the first view display area may present the content of the video chat, and may present the content of the application layer (e.g., webpage video, VOD display, application, etc.).

In some exemplary embodiments, there are priorities in the presentation of different view display areas, and the display priorities of the view display areas are different among the view display areas with different priorities. For example, the priority of the system layer is higher than the priority of the application layer. When the user uses the acquisition selector and window switch in the application layer, the display of the view display area of the system layer is not blocked; and when the size and position of the view display area of the application layer are changed according to the user's choice, the size and position of the view display area of the system layer are not affected.

In some exemplary embodiments, different view display areas are presented on the display in the same priority. Meanwhile, the selector may switch between the first view display area and the second view display area, and when the size and position of the first view display area are changed, the size and position of the second view display area may be changed accordingly.

The display device is generally provided with a quick button for content push on the remote control, or the content recommendation can be made through voice commands. For example, when a video is being played on the display screen, a user interface is displayed on the display screen, which is triggered by clicking the remote control, touching the screen, gestures or others. The user interface includes the currently displayed content and a content recommendation area. The content recommendation area includes a set of multiple option bars, which includes a screenshot displaying the current screen or an image acquired by the camera, the recommended content related to the image recognition content of the image, and the user control display bars on the interface for inputting the user operations associated with the image.

In some implementations, the function keys corresponding to the display device may be provided in the control device.

Taking the remote control as an example, the shortcut key related to the content recommendation is used to obtain the content on the current display interface and sent to a server for content recommendations. Then the recommended content from the server is received and shown on the content recommendation area of the display.

When performing the content recommendation, the display device needs to send an image to the server for content recommendation, and the server performs person recognition or product recognition based on the image and performs the corresponding content recommendation based on the recognized person or product.

In some embodiments, when the display device is to perform the content recognition in the homepage or video play, the display screen of the current display device is generally captured as the image to be sent to the server. In addition, the captured image and the recommended content sent from the server are displayed on the display as the second user interface. Alternatively, the second user interface includes the recommended content, and may also include the captured image or the thumbnail of the screenshot image as the second image.

Specifically, when the content is played on the display and the user triggers a button for content recommendation on the remote control or triggers a voice command related to the content recommendation, a screenshot operation is taken, the current screen is captured, and a screenshot file is obtained. Alternatively, the display device may transmit the original of the screenshot file to the server, or the display device may compress the screenshot file (such as WebP format compression) to obtain a compressed file and then send the compressed file to the server.

After receiving the screenshot file or the compressed screenshot file sent from the display device, the server recognizes the person or object and returns the recognition result to the display device.

The display device receives the recommended content sent from the server, displays it in the content recommendation area, and can receive the user's selection in the content recommendation area and enter the recommended content for user experience.

In other embodiments, the display device runs in the mirror application. When the user wants to perform the content recognition based on the content obtained by the camera, the image obtained by the camera can be directly obtained and be sent to the server because the camera is in use, and moreover, the disadvantage that the screenshot action consumes a lot of resources may be avoided.

Therefore, in the mirror application, upon receiving an button input for content recommendation from the user on the remote control or a voice command related to the content recommendation, the currently displayed image file collected by the camera is acquired, and the image collected by the camera and the recommended content sent from the server are displayed on the display as the second user interface. The second user interface includes the recommended content, and may also include an image obtained by the camera or a thumbnail of the image obtained by the camera as the first image.

Specifically, when the preview screen acquired by the camera in the mirror application is displayed on the display, the user triggers the n button for content recommendation on the remote control or triggers a content voice command related to the content recommendation to perform a photo taken operation and obtain the currently displayed image file collected by the camera. Alternatively, the display device may transmit the original image file to the server, or the display device may compress the image file (such as WebP format compression) to obtain a compressed file and then send the compressed file to the server.

After receiving the image file or the compressed image file sent from the display device, the server recognizes the person or object and returns the recognition result to the display device.

The display device receives the recommended content sent from the server, displays it in the content recommendation area, and can receive the user's selection in the content recommendation area and enter the recommended content for user experience.

Figure 4:
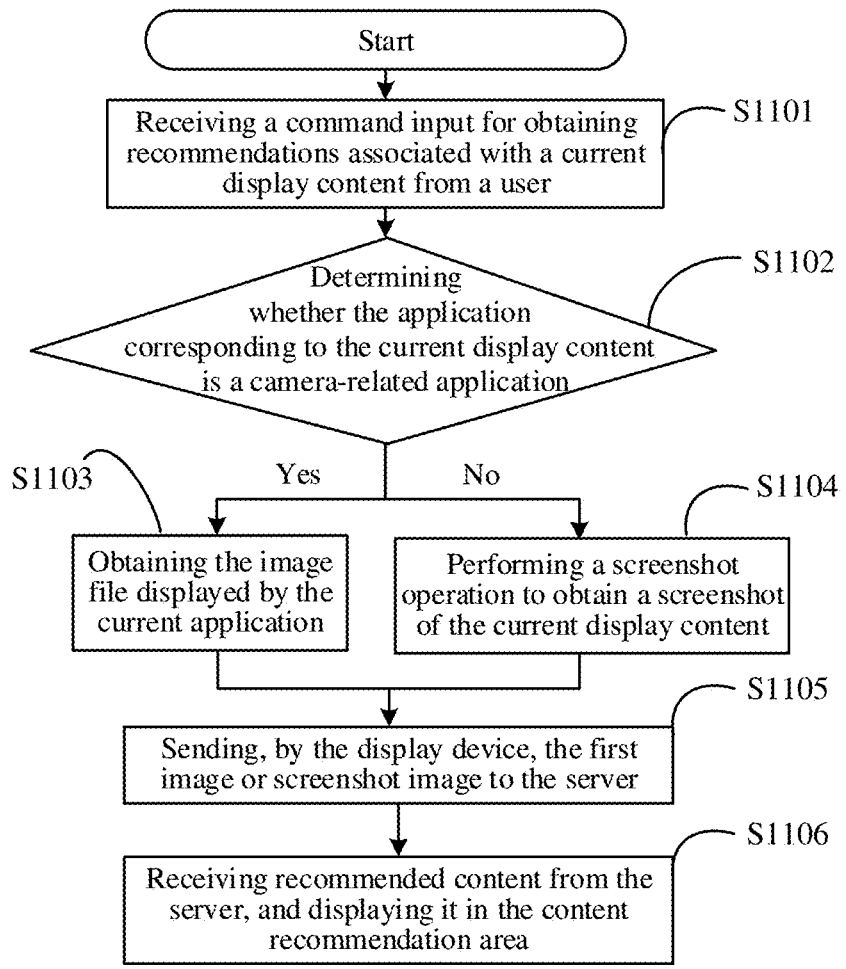
FIG. 4 is a schematic diagram of a method for content recommendation according to an embodiment of the present disclosure.

In an embodiment as shown in FIG. 4, the display device can not only play the video content, but also display the preview images and take photos in the mirror application. The user triggers the button for content recommendation on the remote control or triggers a voice command related to the content recommendation, and the display device determines how to obtain the image to be sent to the server by identifying the currently displayed application, as follows.

S1101: receiving a command input for obtaining recommendations associated with a current display content from a user.

S1102: determining whether the application corresponding to the current display content is a camera-related application.

Specifically, the determination is done by determining the package name of the currently displayed application via ActivityManager in Android system, and based on the package name and a flag bit for the data package corresponding to the package name, determining the file storage location corresponding to the data package.

S1103: if the application corresponding to the current display content is a camera-related application, obtaining the image file displayed by the current application.

If the image file obtained from the camera is stored in the corresponding storage location, it indicates that the currently displayed application is camera-related application, like the mirror application. The current image file in the corresponding storage location is obtained as the first image. A first user interface including the first image is displayed on the display. Alternatively, the current image file in the corresponding storage location may also be compressed, and then be used as the first image.

S1104: if the application corresponding to the current display content is not a camera-related application, performing a screenshot operation to obtain a screenshot of the current display content.

If the image file obtained from the camera is not stored in the corresponding storage location, it indicates that the currently displayed application is not the mirror application. The content currently displayed on the display is captured d as the screenshot image. A second user interface including the screenshot image is displayed on the display. Alternatively, the screenshot image may be compressed, and then used as the image sent to the server.

S1105: sending, by the display device, the first image or screenshot image to the server.

S1106: receiving recommended content from the server, and displaying it in the content recommendation area.

Based on the schematic diagram of the operation scenario between the display device 200 and the control device 100 shown in FIG. 1, the display device 200 can provide various applications, some of which require that some information associated with the application is presented on the user interface. For example, the view of the camera capture area is presenting on the user interface. When the user selects the mirror application by operating the control device, the display device 200 turns on the camera and displays the image in the camera capture area on the user interface.

Figure 5A:
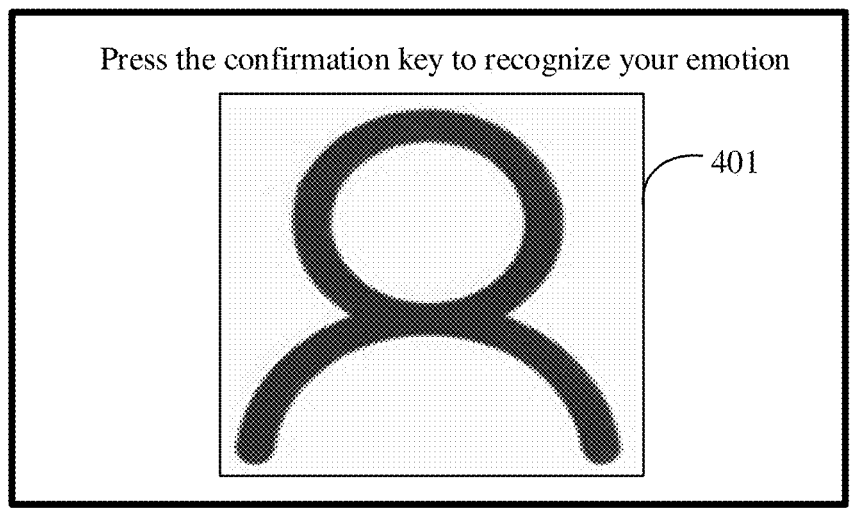
FIGS. 5A-5B are schematic diagrams of a user interface for displaying a capture area of a camera in some embodiments of the present disclosure.

Taking a user interface displaying the image of the camera capture area as an example, FIG. 5A exemplarily shows the content of the user interface. The user interface includes a display area 401.

The display area 401 displays the image captured by the camera in real time. Specifically, after the user starts the mirror application through the control device, the display device turns on at least one camera configured for the display device, and displays the image in the camera capture area in the display area 401 of the user interface, which real-time displays the content captured by the camera.

Here, the "at least one camera configured for the display device" refers to multiple cameras covering different capture areas may be configured for the display device. For example, the display device is equipped with a front camera that takes images in the area directly facing the display of the display device. The definition of the image displayed in the display area 401 is related to the resolution of the display device and is also related to the pixels of the camera, which is not limited in the present disclosure.

The display device is instructed to obtain the content recommendation information associated with the face according to the face in the current camera capture area, and display the image in the current camera capture area and the content recommendation information. Accordingly, corresponding prompt information is displayed on the user interface to prompt the user to perform the corresponding operations to complete the information push function. In some embodiments, the prompt information "press the confirm key to recognize your emotion" is displayed at the top of the display area 401. In other embodiments, the direction of the camera is adjusted by using a direction key so that the image or a set of images, captured by the camera in real time, and displayed in the display area 401, meets the user's requirements, and a back key is used to return to the homepage interface or return to the previous user interface.

Here, the information associated with the face refers to the resources obtained according to the feature information of the face, and the feature information includes but is not limited to: emotion, age, gender, glasses, charm value, and the location of the face in the image. The emotions include happiness, sadness, upset, calmness, etc.; the charm value refers to the value calculated according to the organ locations on the faces and skin condition of the face. The higher the charm value, the better-looking the corresponding face.

Figure 5B:
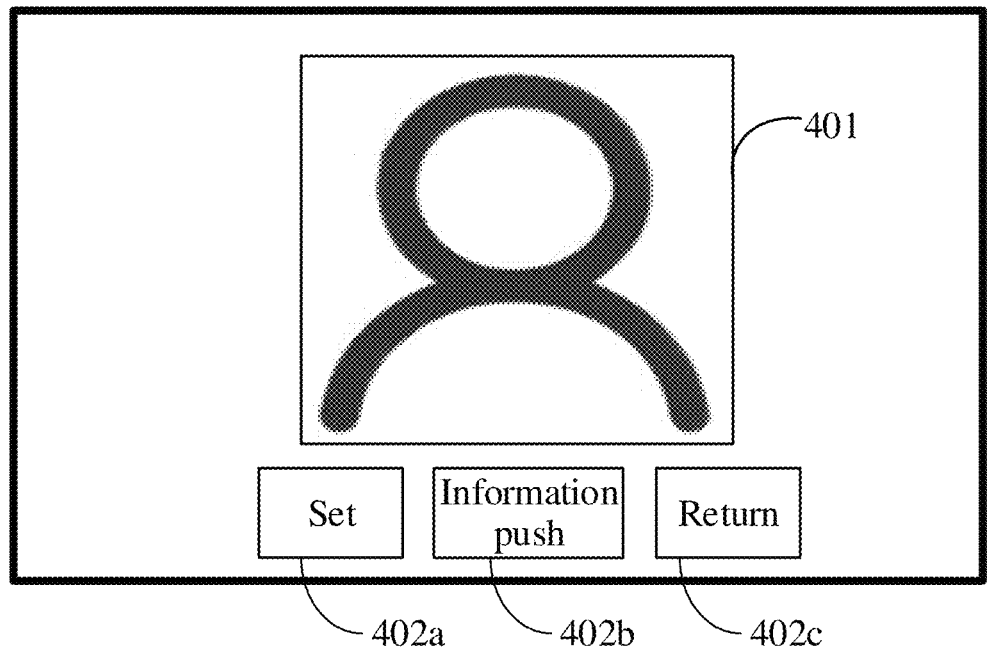

FIG. 5B exemplarily shows another user interface for displaying the image of the camera capture area. As shown, the user interface includes a display area 401 and a function option area 402 below the display area 401.

The function option area 402 displays some function options related to the display area 401, and the function options includes a setting function option 402a, an information push function option 402b, and a return function option 402c.

Here, the setting function option 402a is selected to provide settings for the content displayed in the display area 401. The user triggers multiple setting functions by clicking on the setting function option 402a through the control device, such as: the setting of the resolution of the display area 401, the setting of the camera direction, the setting of the focal length, the size setting of the display area 401, etc.

The information push function option 402b is selected to display an image among a set of images captured by the camera in real time and the content recommendation information associated with a face in the image. In some embodiments, the display device responds to the information push function option, and if it recognizes that there is no face in the image obtained from the images captured by the camera in real time, a prompt will be displayed in the display area 401, and inform the user that the content recommendation information associated with the face cannot be obtained, so that after the user uses the setting provided by the setting function option 402a or uses other methods to make the display device respond the information push function option 402b, the image displayed in the display area 401 includes at least one face.

The return function option 402c is selected to return to the system homepage interface or return to the previous user interface.

In some exemplary embodiments, the function option area 402 also includes a recording function option (not shown), which is selected to record images captured by the camera in real time within a set time period.

In other exemplary embodiments, the function option area 402 also includes a beauty function option (not shown), which is selected to perform beauty processing on the image displayed in the display area 401. The beauty function option can provide one-click beauty, and can also provide multiple beauty function options, such as filter, face editing whitening, etc., which are not limited in the present disclosure.

In yet other exemplary embodiments, the function option area 402 also includes a photo taken option (not shown), which is only used to obtain an image from a set of images captured by the camera in real time. In this case, the display device does not need to perform the face recognition on the image, that is, the image may include no face.

In one case, the photo taken option can realize the functions realized by the above information push function option, that is, the function option area 402 only provides the photo taken function option without providing the information push function option. In a specific implementation, a user can click on the photo taken function option through the control device, and the display area 401 displays an image among a set of images captured by the camera and the content recommendation information associated with a face in the image in response, and in this case, the display device needs to perform the face recognition on the captured image.

It should be noted that the function option area may be located below the display area or may be located on the left side of the display area, etc., which is not limited in the present disclosure.

It should be noted that the multiple options in the function option area may be arranged and displayed in a one-dimensional manner or may be arranged and displayed in a two-dimensional manner, which is not limited in the present disclosure.

It should be noted that the multiple options provided in the above functional option area are only examples, and the present disclosure is not limited thereto.

Figure 6:
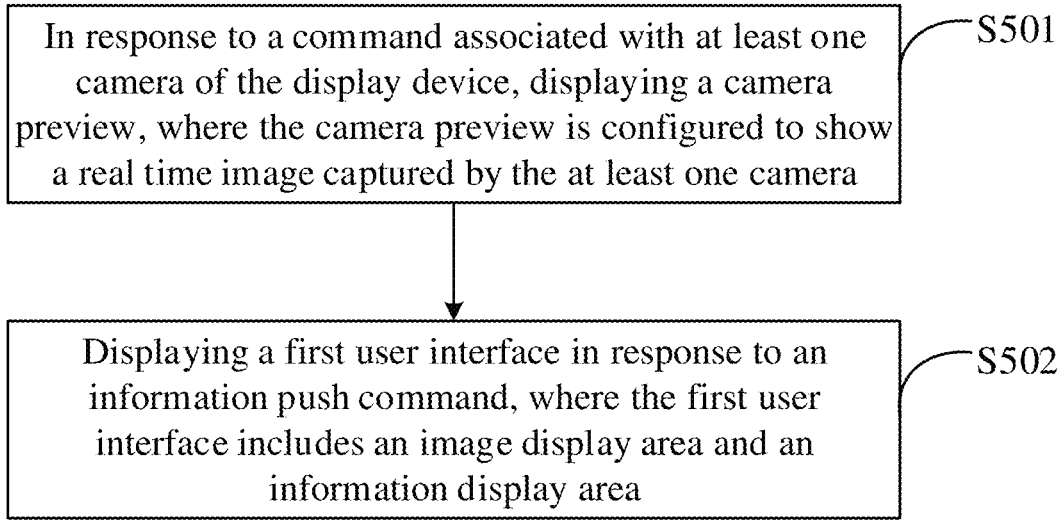
FIG. 6 is a flow schematic diagram of a display method according to an embodiment of the present disclosure.

Based on the foregoing user interface, FIG. 6 shows a schematic flowchart of a display method according to an embodiment of the present disclosure.

As shown, the process includes the following steps.

S501: in response to a command associated with at least one camera of the display device, displaying a camera preview, where the camera preview is configured to show a real time image captured by the at least one camera.

A user issues a command related to at least one camera in the display device to the display device via the control device, for example, issues a command for starting the mirror application. Upon receiving the command, the display device turns on the at least one camera and displays the user interface as shown in FIG. 5A or the user interface as shown in FIG. 5B in response.

S502: displaying a first user interface in response to an information push command, where the first user interface includes an image display area and an information display area.

The user clicks the confirmation button on the control device or clicks the information push option in the function option area through the control device, and the first user interface is displayed in response, where the first user interface is used to display the push resource. Here, the first user interface includes an image display area and an information display area, the image display area displays an image acquired by the at least one camera, and the information display area displays the content recommendation information associated with a first face recognized in the image.

Figure 7A:
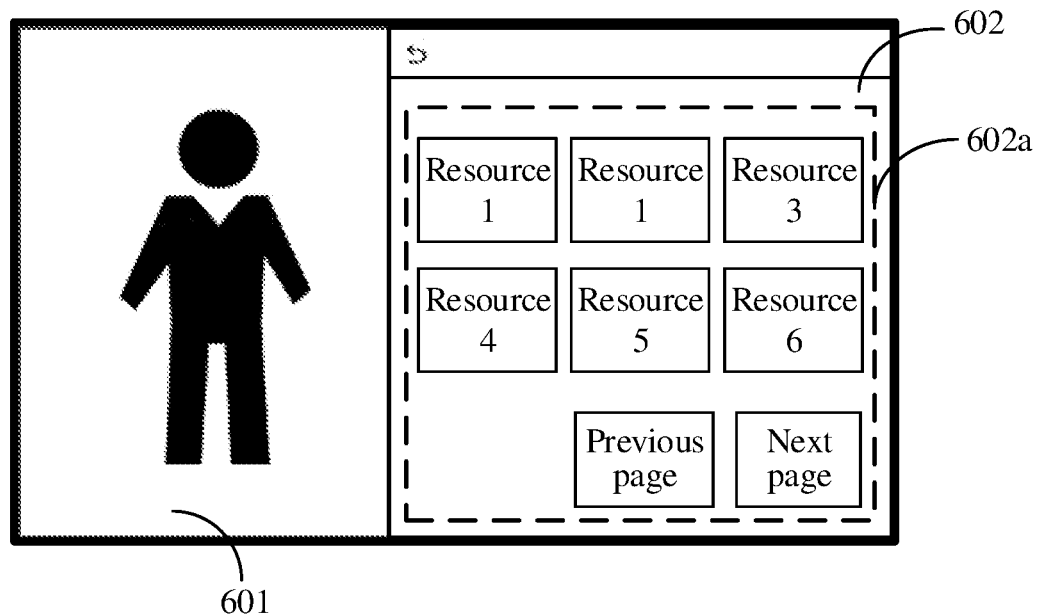
FIGS. 7A-7F illustrate user interfaces for displaying push resources according to some embodiments of the present disclosure.

Referring to FIG. 7A, it is a schematic diagram of a first user interface for displaying push resources according to an embodiment of the present disclosure.

As shown, the first user interface includes an image display area 601 and an information display area 602. The information display area 602 includes a content recommendation information display sub-area 602a. The layer where the image display area 601 is located is partially overlapped with the layer where the information display area 602 is located.

The image display area 601 displays an image among a set of images captured by at least one camera in real time, and the image includes a first face. Alternatively, the image display area 601 has a window processing option (not shown) for processing such as moving, zooming and rotating the image displayed in the image display area 601; or corresponding function keys are set in the control device. Taking the remote control as an example, the left direction key is configured to move the image horizontally to the left, the right direction key is configured to move the image horizontally to the right, the volume-up key is configured to enlarge the image, the volume-down key is configured to reduce the image, and so on.

The information display area 602 includes a content recommendation information display sub-area 602a, which displays the content recommendation information associated with the first face in the image displayed in the image display area, that is, display the push resource obtained according to the feature information of the first face. The user clicks on the push resource through the control device, and the display device displays a window corresponding to the push resource in response.

Figure 7B:
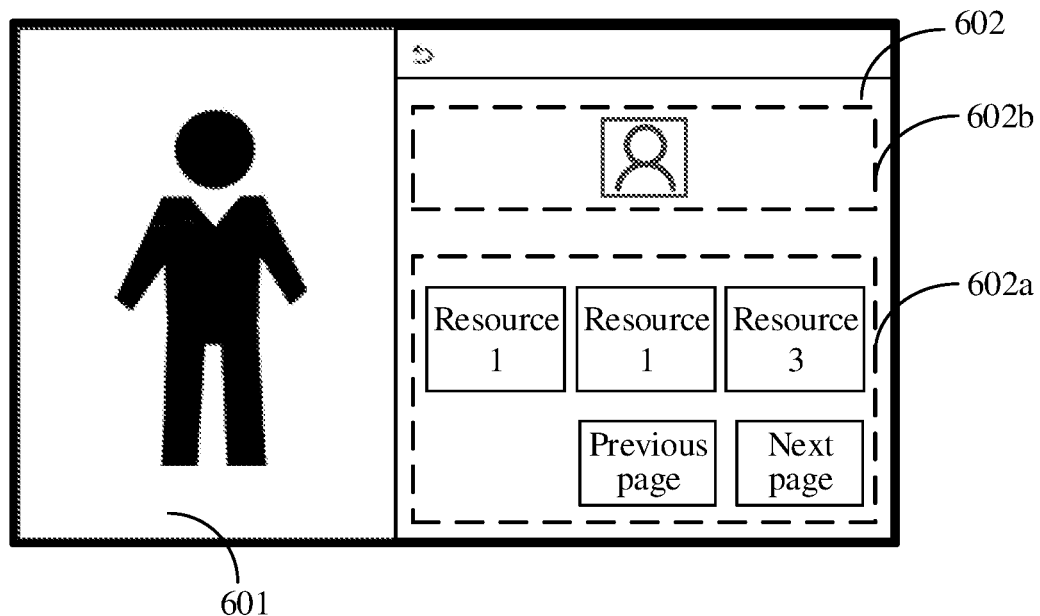

Referring to FIG. 7B, it is a schematic diagram of another first user interface for displaying push resources according to an embodiment of the present disclosure.

As shown, the first user interface includes an image display area 601 and an information display area 602. The information display area 602 includes a face thumbnail display sub-area 602b and a content recommendation information display sub-area 602a. The layer where the image display area 601 is located is partially overlapped with the layer where the information display area 602 is located.

The face thumbnail display sub-area 602b displays the first face in the image display area, and the first face in the thumbnail is consistent with the first face recognized in the image displayed in the image display area 601.

Figure 7C:
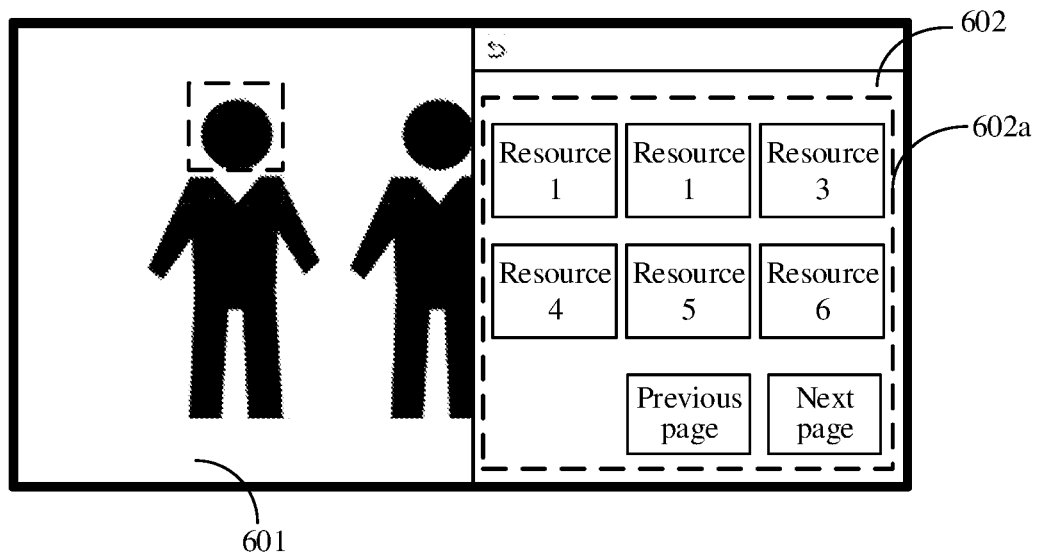

Referring to FIG. 7C, it is a schematic diagram of another first user interface for displaying push resources according to an embodiment of the present disclosure.

As shown, the first user interface includes an image display area 601 and an information display area 602. The information display area 602 includes a content recommendation information display sub-area 602a. The layer where the image display area 601 is located is partially covered by the layer where the information display area 602 is located.

The faces recognized in the image display area 601 include a first face and a second face. The first face is marked by a dashed box, and the push resource displayed in the content recommendation information display sub-area 602a is the content recommendation information associated with the marked face in the image display area 601, i.e., the content recommendation information associated with the first face. In this case, the user can switch the dashed box in the image display area 601 through the control device to make the second face fall into the dashed box, and the content recommendation information display sub-region 602a will be updated to display the content recommendation information associated with the marked second face.

It should be noted that marking may be in the form of a dashed box, an arrow, or a zoomed-in version of the target face, which is not limited in the present disclosure.

Figure 7D:
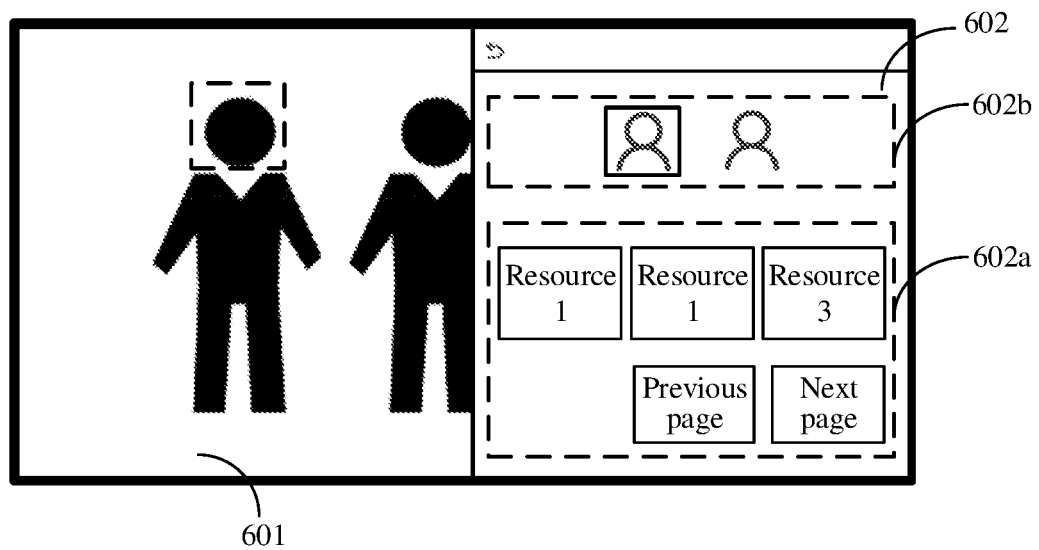

FIG. 7D exemplarily shows a schematic diagram of another first user interface for displaying push resources.

As shown, the first user interface includes an image display area 601 and an information display area 602. The information display area 602 includes a face thumbnail display sub-area 602b and a content recommendation information display sub-area 602a. The layer where the image display area 601 is located is partially overlapped with the layer where the information display area 602 is located, and the faces recognized in the image display area 601 include a first face and a second face.

The face thumbnail display sub-area 602b displays the thumbnail sequence of the faces recognized in the image displayed in the image display area 601, that is, the thumbnail of the first face and the thumbnail of the second face. The push resource displayed in the content recommendation information display sub-region 602a is the content recommendation information associated with the face falling into the focus frame (the focus frame is represented by a solid line in the figure) in the face thumbnail display sub-region 602b, that is, the content recommendation information associated with the first face. The user can move the focus frame in the face thumbnail display sub-area 602b through the control device to make the thumbnail of the second face fall into the focus frame. The content recommendation information display sub-area 602a will be updated to display the content recommendation information associated with the second face, and the image display area 601 will use a dotted box to mark the second face.

In one case, all the faces recognized in the image display area 601 can be marked, and the face, corresponding to the push resources displayed in the information display area 602, is marked by using another visually marked way. Thus, when the user finds that not all faces in the image are marked, the user can adjust the definition of the image through the control device, etc., so that the display device can re-recognize the faces in the image. For example, all the faces recognized in the image are marked by dotted boxes, and a box can be further identified in color in the image display area 601, so that the color of the focus frame in the face thumbnail display sub-area 602*b* is the same as the color of the dotted box. For another example, all the faces recognized in the image are marked by dotted boxes, and a dotted box can be further identified with magnification in the image display area 601, so that the face marked by the magnified dotted box corresponds to the push resources displayed in the content recommendation information display sub-area 601*a* (this approach may be applicable to a scenario where more than one face is recognized in the image displayed in the image display area and no face thumbnail display sub-area is set in the information display area).

Based on the first user interface shown in FIGS. 7*a*, 7*b*, 7*c* and 7*d*, a face feature information display area may also be configured in the information display area 602, and used to display the feature information of the face corresponding to the push resource in the content recommendation information display sub-area 602*a*.

Alternatively, a window processing option may be set in the information display area, or the corresponding function key may be set in the control device. The setting method thereof is similar to the setting described in the image display area, and will omit here.

It should be noted that, in the first user interface, the image display area can be partially covered by the information display area, or the image display area and the information display area can be displayed at the left side and right side respectively, or the image display area and the information display area can be displayed at the top and bottom respectively, which is not limited in the present disclosure.

It should be noted that the arrangement order of the face thumbnail display sub-area, the content recommendation information display sub-area and the face feature information display area in the information display area is not limited in the present disclosure.

In one exemplary embodiment, in S502, in response to the command for information push, the following process is performed: acquiring a first image among a set of images captured by at least one camera in real time; invoking a face recognition module to perform the face recognition on the first image, and sending the feature information of at least the recognized first face to a server; marking the first face in the first image on the display (such as focus frame, zooming and others visually ways to distinguish it from unmarked area); receiving at least the content recommendation information associated with the first face sent from the server; displaying the first image with the marked first face in the image display area, and displaying the content recommendation information associated with the first face in the information display area. Here, the content recommendation information associated with the first face is selected by the server from an information database according to the feature information of the first face.

In one exemplary embodiment, the information display area includes a face thumbnail display sub-area and a content recommendation information display sub-area. The face thumbnail display sub-area displays a thumbnail sequence of the face recognized in the image displayed in the image display area, the thumbnail sequence includes at least a thumbnail of the first face, and the thumbnail of the first face falls into a focus frame; and the content recommendation information display sub-area displays the content recommendation information associated with the first face that falls into the focus frame.

In one exemplary embodiment, at least a second face is further recognized in the image displayed in the image display area, then at least the first face in the image is marked, and the thumbnail sequence further includes a thumbnail of the second face.

In one exemplary embodiment, in response to a command from a directional key of the remote control, the thumbnail of the second face in the thumbnail sequence in the face thumbnail display sub-area falls into the focus frame, the information of the content recommendation information display sub-area is updated to the content recommendation information associated with the second face, and the second face is marked in the first image displayed in the image display area.

In one exemplary embodiment, in response to a command from a directional key of the remote control, the following process is performed: causing the thumbnail of the second face in the thumbnail sequence of the face thumbnail display sub-area into a focus frame; acquiring the content recommendation information associated with the second face, and updating the information displayed in the content recommendation information display sub-area to the information associated with the second face; and marking the second face in the first image displayed in the image display area.

The step of acquiring the content recommendation information associated with the second face includes: acquiring the locally-stored content recommendation information associated with the second face, where the content recommendation information associated with the second face is acquired from the server and saved locally after the second face is recognized; or sending the feature information of the second face to the server, and receiving the content recommendation information associated with the second face returned from the server based on the feature information of the second face.

In one exemplary embodiment, in response to a command from the directional key of the remote control, the following process is further performed: moving and/or zooming the first image in the image display area to make the area where the second face is marked in the visible distinguished area in the image display area.

Firstly, the terms in the operating system will be described to make it easy to understand the discussions with reference to the following figures.

ImageView: a control, i.e., image display module, may be used to mark a face in an image, and move, reduce, enlarge and rotate the displayed image.

Activity: an application, may be used to display the acquired image on the display screen of the smart TV through ImageView.

Layout: layout display module, may be used to display and manage the content displayed in the display window.

Figure 9:
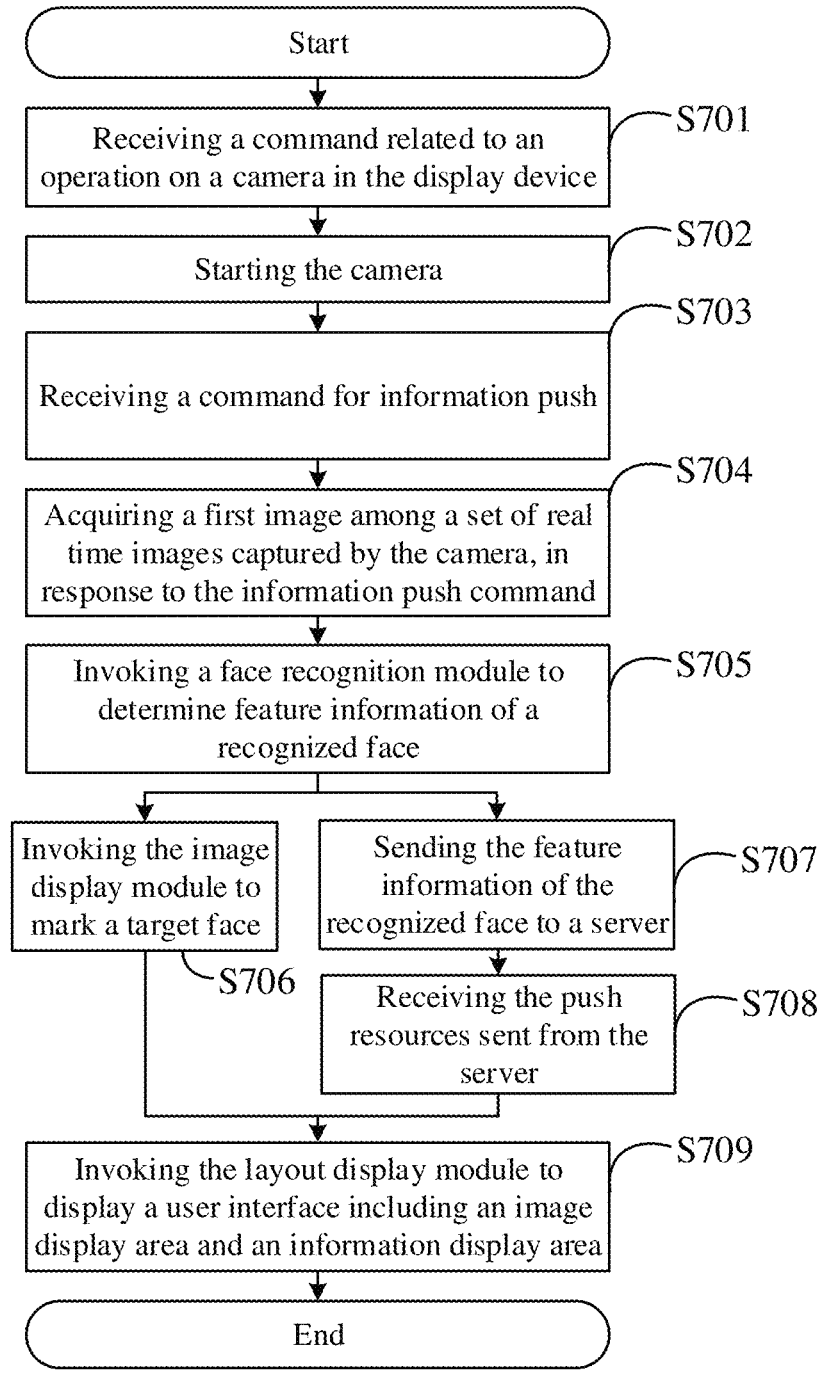
FIG. 9 is a flow schematic diagram of another display method according to an embodiment of the present disclosure.

Referring to FIG. 9, it is a flow schematic diagram of a display method according to an embodiment of the present disclosure.

As shown, the process includes the following steps.

S701-S702: in response to a command related to an operation on a camera in the display device, starting the camera.

As an example, where the control device is a remote control, the user interface of the smart TV in this work mode shows at least an application (mirror application) that pushes the resources associated with the face feature information, and a user clicks on the mirror application through the confirmation button on the remote control, i.e., sends a command for launching the mirror application in the smart TV. In response, the smart TV launches the camera and displays the user interface as shown in FIG. 3.

In an implementation scenario, for the smart TV in the standby mode, the command for launching the mirror application can be considered as a wake-up command. A key on the remote control may be configured to act as a shortcut key for the mirror application which may cause the smart TV in the standby mode to respond. Specifically, the smart TV responds to the command to power on the main board, enters a work mode from the standby mode, and does not display the homepage but directly starts the camera and displays the user interface as shown in FIG. 3 when entering the work mode.

For example, a mirror application button can be configured on the remote control. In response to a click on the mirror application button from the user, the smart TV starts the camera and displays the user interface as shown in FIG. 3, regardless of whether the current user interface shows the mirror application. For the smart TV in the standby mode, in response to a click on the mirror application button, the main board of the smart TV is powered on, and the smart TV enters a work mode from the standby mode, a starts the camera and displays the images captured by the camera in real time when entering the work mode (for example, after the boot animation is played), as shown in the user interface of FIG. 5A or FIG. 5B.

S703: in response to a command for information push, performing steps S704-S709.

In S702, the smart TV displays a user interface as shown in FIG. 5A or FIG. 5B. Taking the smart TV displaying the user interface in FIG. 5A as an example, the user clicks on a key (such as the confirm button) corresponding to the display area on the remote control to send a command for information push to the smart TV, and the smart TV executes the steps S704-S709 in response. Taking the smart TV displaying the user interface shown in FIG. 5B as an example, the user clicks the "information push" shown in the function option area through the remote control to send a command to the smart TV, and the smart TV executes the steps S704-S709 in response; and of course, in a scenario where the smart TV displays the user interface shown in FIG. 5B, it is also possible to send the information push command to the smart TV by clicking on the function key corresponding to the display area on the remote control, and the specific response process is similar to the response process of FIG. 5A and will not be repeated here.

S704: acquiring a first image among a set of real time images captured by the camera, in response to the information push command.

In S704, the camera takes real time images in the capture area, and acquires a first image from the captured images.

S705: invoking a face recognition module to determine feature information of a recognized face.

The face recognition module is invoked to perform the face recognition on the first image, and after at least one face is recognized, the face recognition module obtains the feature information of the at least one recognized face. The feature information includes but is not limited to: emotion, age, gender, glasses, charm value, and location of the at least one face in the image, where the emotions include happiness, sadness, upset, calmness, etc.; the charm value refers to the value calculated according to the organ arrangements on the face and skin condition of the face. The higher the charm value, the better-looking the corresponding face.

After S705 is executed, S706 and S707 may be executed simultaneously according to the feature information of the recognized face.

S706: invoking the image display module (ImageView) to mark a target face.

Specifically, after determining the feature information of the recognized face, the image display module can be invoked directly, or the image display module can be invoked by launching a new application (Activity). After the image display module is invoked, the face recognized in the image displayed in the display area is marked according to the position of the face in the image. There are two marking methods: one is to mark all the faces recognized in the image, where a target face is marked differently from other faces, for example, all the faces recognized in the image are marked by face recognition frames, but the color of the face recognition frame for marking the target face is different from the color of the face recognition frames for marking other faces; and the other marking method is to visually identify only the recognized target face.

Here, when more than one face is recognized, a target face is a face at a predefined position. For example, the first recognized face from left to right in the display area is selected as a target face. For another example, a face near the center of the image is selected from multiple recognized faces as a target face.

S707-S708: sending the feature information of the recognized face to a server, and receiving the push resources sent from the server.

In S707, the feature information of the face recognized by the face recognition module is sent to the server. Specifically, when more than one face is recognized in the image, only the feature information of the target face is sent to the server, or the feature information of all the recognized faces is sent to the server.

After receiving the face feature information, the server calculates the feature information of a certain face according to an algorithm to obtain the recommended resource types for the feature information, selects the push resources from the information database according to the determined resource types, and sends the selected push resources to the smart TV.

For example, in the case of recommended resources related to emotion, emotion weights more than other factors in the feature information when the resource type is calculated for recommendation. If the emotion is sad, comedy videos, cheerful music and funny pictures can be recommended; if the emotion is calm, the videos, books, games, etc. that require attention concentration can be recommended; in this way, recommending different resources according to different emotions can soothe the pessimistic emotion, provide intimate intelligence services, and improve user's experience.

For another example, in the case of recommended resources related to age, age factor weights more than factors in the feature information when the resource type is calculated for recommendation. If the age of the user is old, the health programs as well as old fashioned videos, music and novels can be recommended, and the puzzle games can also be recommended; for example, for the young women, the beauty shopping programs as well as popular videos, music, novels, etc. can be recommended; in this way, recommending different resources according to different ages can meet the entertainment requirements of different age groups, provide intimate intelligent services, and improve user's experience.

For another example, for teenagers who wear glasses, videos and pictures related to eyes care can be recommended; for young women or young men with higher attractiveness values, videos related to fashion and live talent shows can be recommended.

S709: invoking the layout display module (Layout) to display a user interface including an image display area and an information display area.

After the target face recognized in the first image is marked and the push resources associated with the target face sent from the service is received, the layout display module is invoked to display the marked image in the image display area and display the push resources associated with the target face in the content recommendation information display sub-area of the information display area.

Specifically, if there is only one face recognized in the first image, the layout display module is invoked to display the user interface as shown in FIG. 7A; if there is more than one face recognized in the first image, the layout display module is invoked to display a user interface similar to FIG. 7C.

Alternatively, in a specific implementation, after the first image among a set of real time images captured by the camera is acquired (see S704), the face recognition module is invoked to perform the face recognition on the first image, and whether a face can be recognized from the first image is determined, and if so, the flow goes to S705; if no, the following steps may be executed: displaying the prompt information, receiving a command related to the display area, updating the interface displayed in the display area according to the command, and then performing S703-S704.

Here, the prompt information is used to inform the user that no face is recognized in the image. According to the prompt information, the user can move the position or adjust the camera direction to make the image displayed in the display area include at least one face. When the image displayed in the display area includes at least one face, the pixels of the image displayed in the display area can be set and adjusted through the setting button of the display area on the remote control or the setting function option in the function option area as shown in FIG. 5B, so that the face recognition module can recognize the face.

Figure 10:
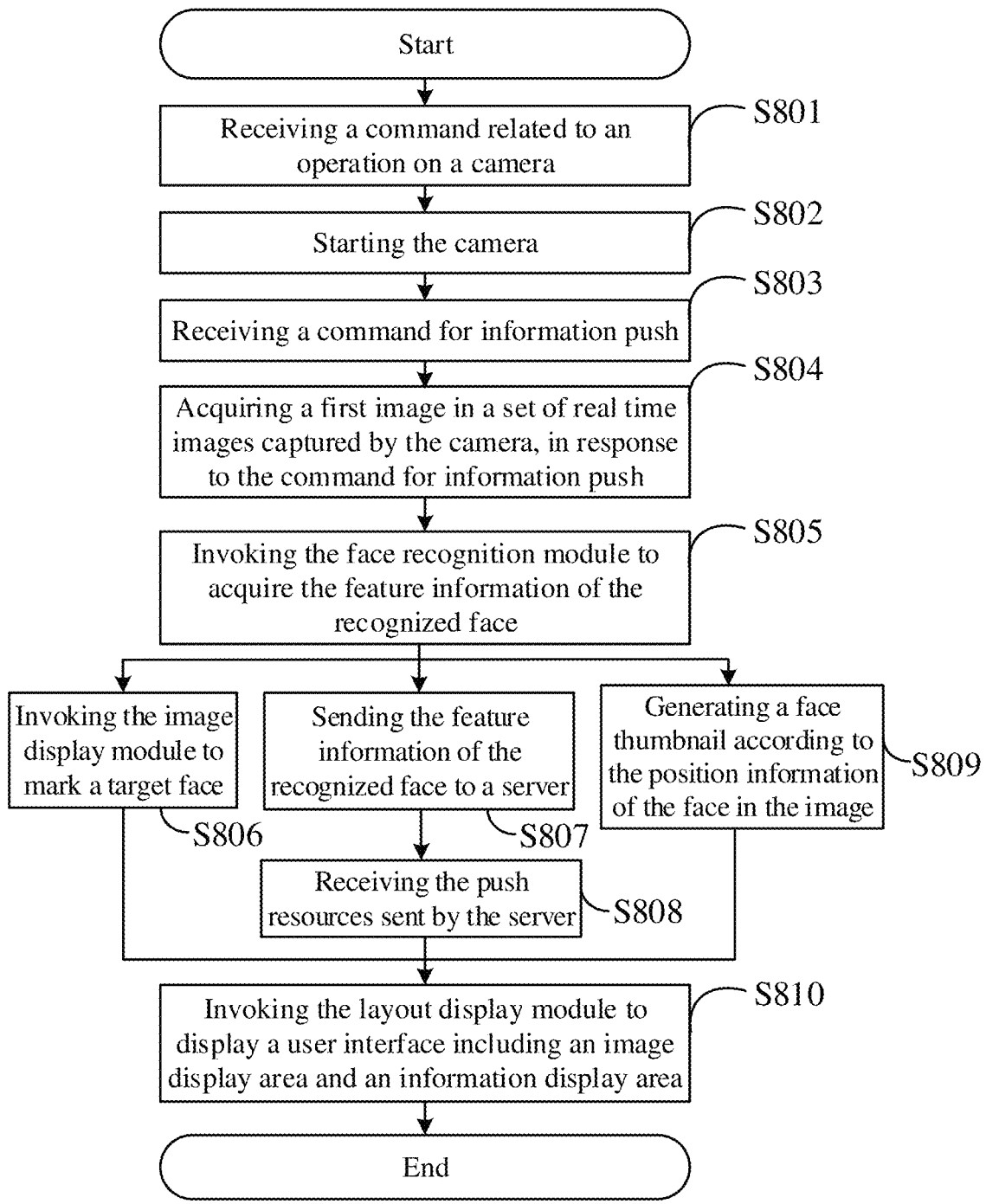
FIG. 10 is a flow schematic diagram of yet another display method according to an embodiment of the present disclosure.

Referring to FIG. 10, it is a flow schematic diagram of another display method according to an embodiment of the present disclosure.

As shown, the process includes the following steps.

S801-S802: in response to a command related to an operation on a camera, starting the camera.

S803: in response to a command for information push, going to steps S804-S810.

S804: acquiring a first image in a set of real time images captured by the camera, in response to the command for information push.

S805: invoking the face recognition module to acquire the feature information of the recognized face.

After S805 is executed, S806, S807 and S809 may be executed simultaneously according to the feature information of the recognized face.

S806: invoking the image display module (ImageView) to mark a target face.

S807-S808: sending the feature information of the recognized face to a server, and receiving the push resources sent from the server.

The specific executions of the above S801-S808 are similar to the specific executions of S701-S708 in FIG. 9, and will omit here.

S809: generating a face thumbnail according to the position information of the face in the image.

Specifically, the recognized face is cut out according to the position information of the face in the image, and the face image obtained by cutout is compressed into a thumbnail, thereby generating a face thumbnail. If there are multiple faces recognized in the image, multiple corresponding face thumbnails are generated.

S810: invoking the layout display module (Layout) to display a user interface including an image display area and an information display area.

After the target face recognized in the first image is marked, the face thumbnail corresponding to the face recognized in the image is generated and the push resources associated with the target face sent from the server is received, the layout display module is invoked to display the marked image in the image display area, display the generated face thumbnail in the face thumbnail display sub-area of the information display area, and display the push resources associated with the target face in the content recommendation information display sub-area of the information display area.

Specifically, if there is only one face recognized in the first image, the layout display module is invoked to display the user interface as shown in FIG. 7B; if there is more than one face recognized in the first image, the layout display module is invoked to display a user interface similar to FIG. 7D.

Alternatively, in a specific implementation, after the first image in the real time images captured by the camera is acquired (see S804), the face recognition module is invoked to perform the face recognition on the first image, and then whether a face can be recognized from the first image is determined, and if a face is recognized in the first image, the flow goes to S805; if no, the following steps may be executed: displaying the prompt information, receiving a command related to the display area, updating the interface displayed in the display area according to the command, and then performing S803-S804.

Here, the prompt information is used to inform the user that no face is recognized in the image. According to the prompt information, the user can move the position or adjust the camera direction so that the image displayed in the display area includes at least one face. When the image displayed in the display area includes at least one face, the pixels of the image displayed in the display area can be set and adjusted through the setting button of the display area on the remote control or the setting function option in the function option area as shown in FIG. 5B, so that the face recognition module can recognize the face.

In the above-mentioned embodiments of the present disclosure, the display device is equipped with at least one camera, and the display device displays a first user interface in response to a command for information push. The first user interface includes an image display area and an information display area, the image display area displays a first image acquired by the at least one camera, and the information display area displays the content recommendation information associated with the first face recognized in the first image. In this way, the display device uses the camera to take an image, recognizes the user's facial information in the image, and thus recommends content associated with the face for the user according to the user's facial information, providing the user with intelligent services and improving user's experience.

Figure 7E:
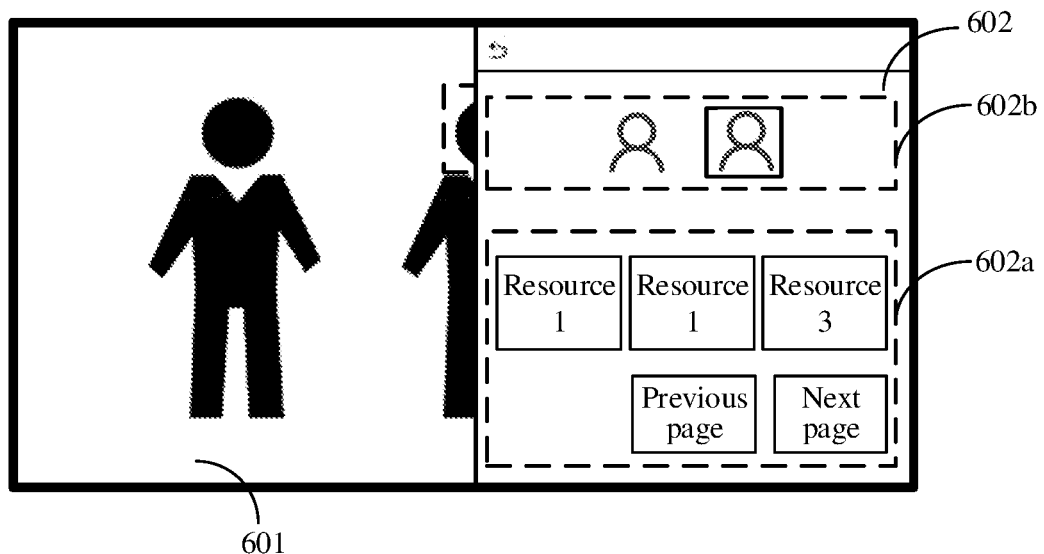
Figure 7F:
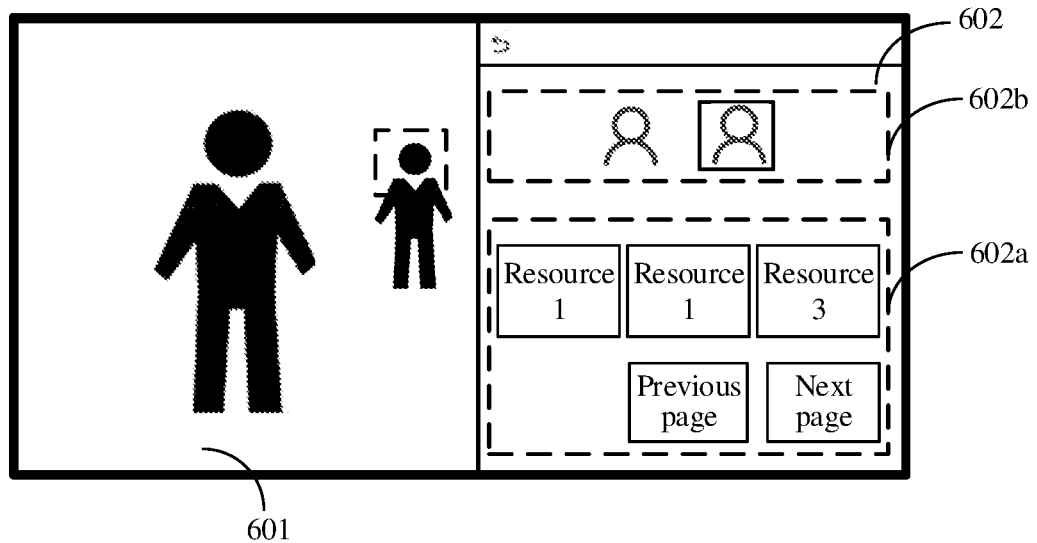

Furthermore, take the "mirror" application scenario as an example, when a user activates the TV camera to take a photo or take a photo preview, the facial feature recognition algorithm is used to obtain the emotion, age, gender and other feature attributes of the person currently displayed in the screen. Then, the facial feature attributes obtained above are transmitted to the background server, and the related videos or others are recommended based on the above feature information and then returned to the terminal device for display. At this time, multiple characters may be recognized, and the user is allowed to operate through the remote-control buttons, to select different characters for a preview of the selected object (the current selected character is highlighted by using a different focus frame from other characters) and update to display the mark and recommendation information for the current user. When a character is selected, the face area of the currently selected character may be covered by the information display area 602 (as shown in FIG. 7E, the second face on the right is covered by the information display area 602, and the user cannot directly view his or her specific face on the screen), or the face area is relatively small and difficult to tell and is not in the middle area of the screen (as shown in FIG. 7F, there are cases where the face area is relatively small and the user is not easy to view within the normal view distance), which is not easy to attract the user's attention and give the user a negative user experience.

In view of the above issues, it is necessary to provide a process for zooming and shifting the character, so that the character that is blocked or small at the edge area of the image is centered and enlarged.

S1501: determining the minimum P area Min[x,y] of a focus face and a predefined threshold DM.

Figure 11:
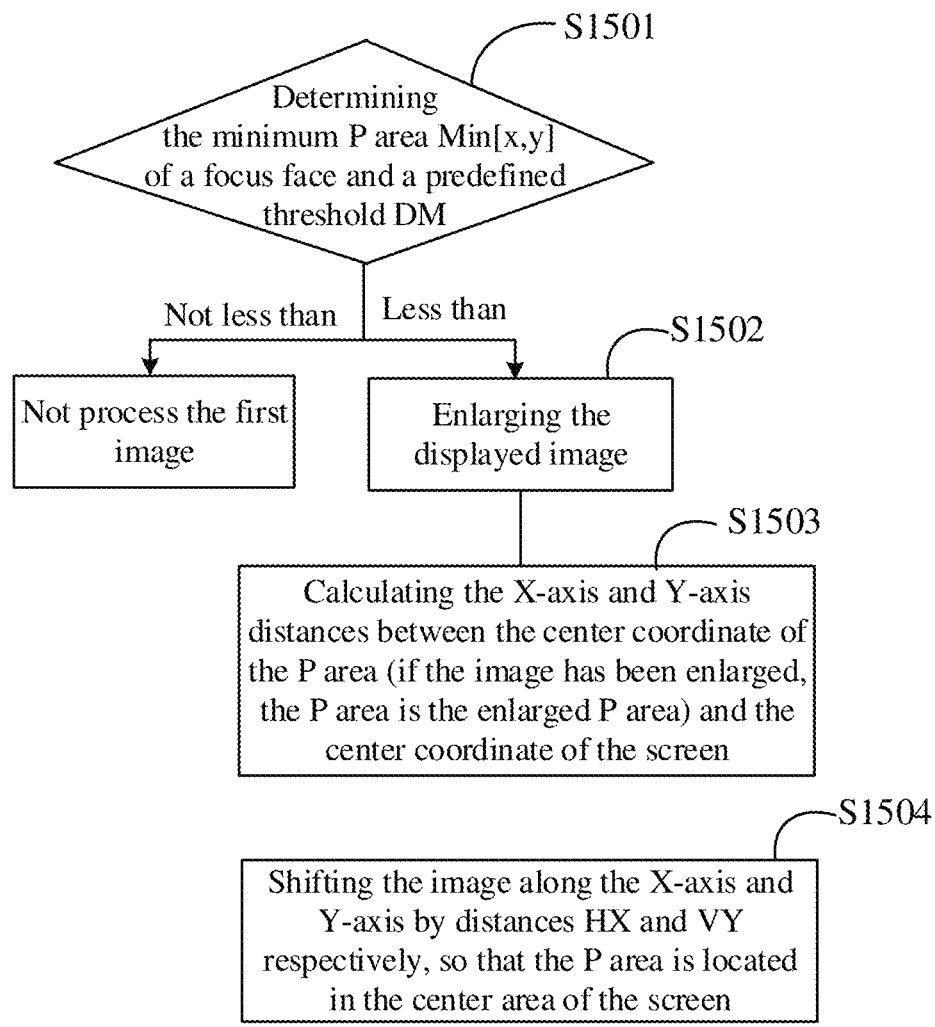
FIG. 11 is a flow schematic diagram of yet another display method according to an embodiment of the present disclosure.

Specifically, whether Min[x,y]/DM is less than 1 (i.e., the ratio of Min[x,y] to DM is less than 1) is determined. The screen coordinate system is as shown in FIG. 11. The predefined threshold DM is a configurable parameter used to determine a minimum size of a target recognized face visible to a user. For example, in order to enable the user to view the selected face image more clearly, the minimum side length of the face area is no less than DM=300 pixels; the minimum length and width Min[x,y] of P area is the smallest side of the currently selected face area in X and Y axis directions. For example, 300 pixels in the X axis direction and 200 pixels in the Y axis direction, so Min[x,y]=200 pixels.

S1502: enlarging the displayed image if the minimum P area Min[x,y] in length and width is less than the predefined threshold DM.

Specifically, the displayed image is enlarged by DM/Min[x,y] times. The displayed image is the first image.

If Min[x,y]/DM>=1, it is determined that the currently selected area can be clearly viewed by the user, so no zoom processing is required.

S1503: calculating the X-axis and Y-axis distances between the center coordinate of the P area (if the image has been enlarged, the P area is the enlarged P area) and the center coordinate of the screen.

Specifically, the X-axis and Y-axis distances HX, VY between the center of the P area (if the image has been enlarged, the P area is the enlarged P area) and the center of the image display area are calculated.

Figure 8A:
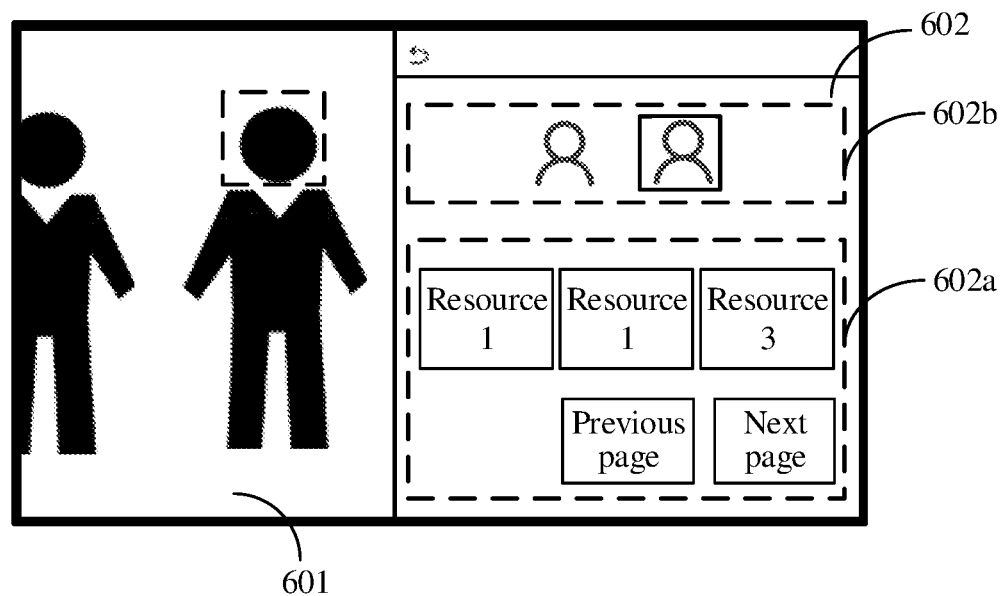
FIGS. 8A-8B illustrate user interfaces for displaying push resources according to some embodiments of the present disclosure.
Figure 8B:
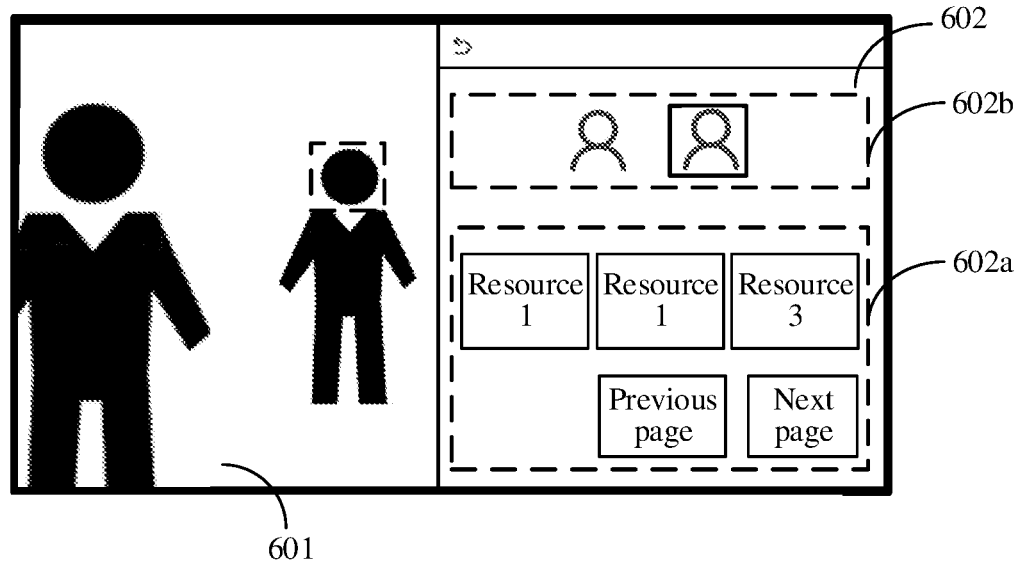

S1504: shifting the image along the X-axis and Y-axis by distances HX and VY respectively, so that the P area is located in the center area of the screen (as shown in FIG. 8A).

In an exemplary embodiment, when the moved area in the image is shifted so that the edge of the image may be missed if the moved area is shifted to the center. When there is some distance between the edge of the image and the content recommendation information display sub-area 602a, the centering process is not performed, Instead, after the screen is enlarged, the x-coordinate of the image edge and the x-coordinate of the screen are obtained, a difference between the x-coordinate of the image edge and the x-coordinate of the screen is determined and shifted. For example, the original right edge coordinate of the upper-right corner of the image and the screen coordinate are the same as (X1, Y1); and after the image is enlarged, the image edge coordinate become (X2, Y2), it needs to move lower left by (|X2−X1|, |Y2−Y1|).

Based on the same concept, an embodiment of the present disclosure provides a display device, which is configured with at least one camera and used for implementing the display method as shown in FIGS. 6-8B.

Figure 12:
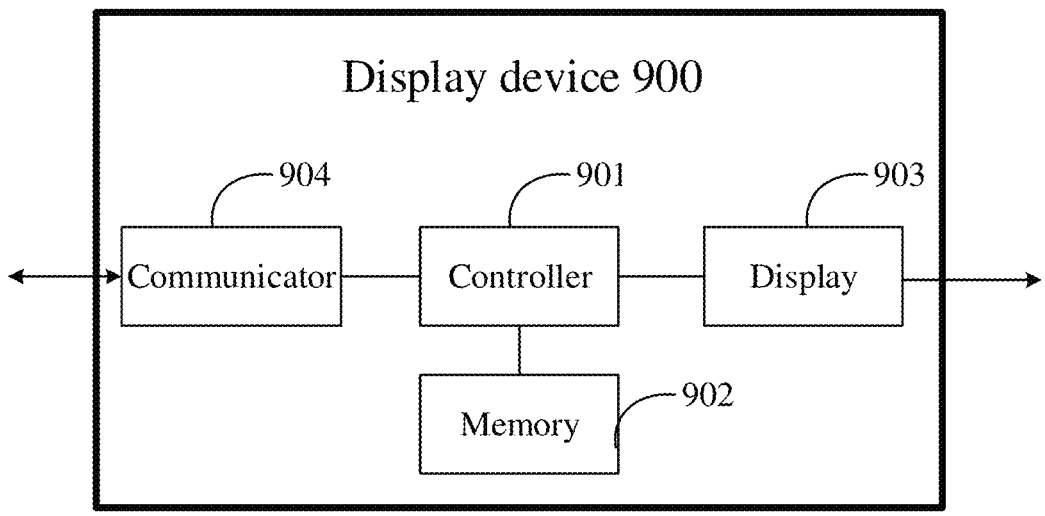
FIG. 12 is a structural schematic diagram of a display device according to an embodiment of the present disclosure.

As shown in FIG. 12, it is a structural schematic diagram of a display device according to an embodiment of the present disclosure.

As shown, the display device 900 includes a controller 901, a memory 902, a display 903 and a communicator 904;

the memory 902 is configured to store computer instructions.

The controller 901 is configured to run the computer instructions stored in the memory to: display a first user interface on the display in response to a command for information push, where the first user interface includes an image display area and an information display area, the image display area displays an image acquired by the at least one camera, and the information display area displays the content recommendation information associated with the first face recognized in the image.

In an exemplary embodiment, the controller 901 is specifically configured to: acquire a first image in a set of real time images captured by the at least one camera; invoke a face recognition module to perform the face recognition on the first image, and send the feature information of at least the recognized first face to a server through the communicator 904; mark the first face in the first image; receive at least the content recommendation information associated with the first face sent from the server through the communicator 904; display the first image in which the first face is marked in the image display area, and display the content recommendation information associated with the first face in the information display area; where the content recommendation information associated with the first face is selected by the server from an information database according to the feature information of the first face.

In an exemplary embodiment, the information display area includes a face thumbnail display sub-area and a content recommendation information display sub-area; the face thumbnail display sub-area displays a thumbnail of the face recognized in the image displayed in the image display area, the thumbnail includes at least one thumbnail of the first face, and the thumbnail of the first face falls into a focus frame; and the content recommendation information display sub-area displays the content recommendation information associated with the first face in the focus frame.

In an exemplary embodiment, the face recognized in the image displayed in the image display area further includes a second face, then at least the first face in the image is marked, and the thumbnail further includes a thumbnail of the second face.

In an exemplary embodiment, the controller 901 is further configured to run the computer instructions stored in the memory 902 to: in response to a command from a directional key of a remote control, cause the thumbnail of the second face in the face thumbnail display sub-area fall into the focus frame, update the information of the content recommendation information display sub-area to show the content recommendation information associated with the second face, where the second face is marked in the first image displayed in the image display area.

In an exemplary embodiment, the controller 901 is further configured to: cause the thumbnail of the second face in the face thumbnail display sub-area fall into a focus frame;

obtain the content recommendation information associated with the second face, and update the information displayed in the content recommendation information display sub-area to show the information associated with the second face; and mark the second face in the first image displayed in the image display area.

In an exemplary embodiment, the controller 901 is further configured to run the computer instructions stored in the memory to: acquire the content recommendation information associated with the second face stored in the memory 902, where the content recommendation information associated with the second face is acquired from the server and saved locally after the second face is recognized; or send the feature information of the second face to the server through the communicator 904, and receive the content recommendation information associated with the second face returned from the server based on the feature information of the second face through the communicator.

In an exemplary embodiment, the controller 901 is further configured to run the computer instructions stored in the memory to: move and/or zoom the first image in the image display area, so that the area where the second face is marked is located in the visible area in the image display area.

In an exemplary embodiment, in the first user interface, the image display area and the information display area are located on different layers, and the layer where the image display area is located is partially overlapped with the layer where the information display area is located.

In an exemplary embodiment, the controller 901 is further configured to run the computer instructions stored in the memory to: before displaying the first user interface in response to the command for information push, in response to a command related to an operation on the at least one camera, displaying a second user interface comprising a set of real time images captured by the at least one camera.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display device, comprising:
    at least one camera, configured to capture an environment scene image;
    one or more applications including a non camera-related application configured not to invoke the at least one camera during running and a camera-related application;
    a display, configured to display a user interface, wherein the user interface is configured to present content of the camera-related application, the non camera-related application or web media content, wherein the camera-related application is an application installed in the display device and configured to invoke the at least one camera to capture image during running of the application;
    a controller in communication with the display and the at least one camera, configured to:
        receive a command for obtaining recommendation information associated with content currently displayed in the user interface;
        determine whether an application corresponding to the content currently displayed in the user interface is the camera-related application, and in response to the application corresponding to the content currently displayed in the user interface being the camera-related application, display a first user interface, wherein the first user interface displays a first image captured by the at least one camera; in response to the application corresponding to the content currently displayed in the user interface being the non camera-related application, display a second user interface different from the first user interface, wherein the second user interface displays a screenshot image of the content currently displayed in the user interface,
    wherein the controller is further configured to:
        invoke a face recognition module to perform a face recognition on the first image, and send feature information of at least a first face recognized in the first image to a server;
        receive recommendation information associated with the first sent from the server;
        present the recommendation information associated with the first face in an information display area;
            wherein the information display area comprises a face thumbnail display sub-area and a content recommendation information display sub-area; the face thumbnail display sub-area displays one or more thumbnails of recognized faces in the first image in an image display area, wherein the one or more thumbnails comprise at least a thumbnail of the first face, and the thumbnail of the first face is located in a focus frame, and the content recommendation information display sub-area displays content recommendation information associated with the first face located in the focus frame;
            wherein a second face is further recognized in the first image in the image display area, the first face in the first image is marked, and the one or more thumbnails further comprise a thumbnail of the second face;
        in response to a focus frame switch command for switching from a first thumbnail of the first face to a second thumbnail of the second face, update the information display area to display content recommendation information associated with the second face; and,
        when the second face is in an overlapping area of the information display area and the image display area, move the second face to a center of the display.

2. The display device of claim 1, wherein the camera-related application is configured to obtain the first image from an image file stored in a storage location corresponding to a package name of the application.

3. The display device of claim 1, wherein:
    the first user interface comprises the image display area and the information display area;
    the image display area displays the first image captured by the at least one camera; and the information display area displays content recommendation information associated with the first face recognized in the first image.

4. The display device of claim 1, wherein the controller is further configured to move the second face to the center of the display by:
obtaining a coordinate of a center of the second face and a coordinate of the center of the display; and
moving the center of the second face to the center of the display.

5. A display method, comprising:
receiving a command for obtaining recommendation information associated with content currently displayed in a user interface of a display device; and
determining whether an application corresponding to the content currently displayed in the user interface is a camera-related application, and in response to the application corresponding to the content currently displayed in the user interface being the camera-related application, displaying a first user interface, wherein the first user interface displays a first image captured by the at least one camera; wherein the camera-related application is an application installed in the display device and configured to invoke at least one camera to capture image during running of the application;
in response to the application corresponding to the content currently displayed in the user interface being the non camera-related application, displaying a second user interface different from the first user interface, wherein the second user interface displays a screenshot image of the content currently displayed in the user interface;
wherein the method further comprises:
invoking a face recognition module to perform a face recognition on the first image, and sending feature information of at least a first face recognized in the first image to a server;
receiving recommendation information associated with the first sent from the server; and
presenting the recommendation information associated with the first face in an information display area;
wherein the information display area comprises a face thumbnail display sub-area and a content recommendation information display sub-area; the face thumbnail display sub-area displays one or more thumbnails of recognized faces in the first image in an image display area, wherein the one or more thumbnails comprise at least a thumbnail of the first face, and the thumbnail of the first face is located in a focus frame, and the content recommendation information display sub-area displays content recommendation information associated with the first face located in the focus frame;
recognizing a second face in the first image display area, and marking the first face in the first image, wherein the one or more thumbnails further comprise a second thumbnail of the second face;
in response to a focus frame switch command for switching from a first thumbnail to the second thumbnail, updating the information display area to display recommendation information associated with the second face;
in response to the second face being in an overlapping area of the information display area and the image display area, moving the second face to a center of the display.

6. The display method of claim 5, wherein the camera-related application is configured to obtain the first image from an image file stored in a storage location corresponding to a package name of the application.

7. The display method of claim 5, wherein the first user interface comprises image display area and the information display area, and the image display area displays the first image captured by the at least one camera; and the information display area displays content recommendation information associated with the first face recognized in the first image.

8. The display method of claim 5, wherein the moving the second face to a center of the display comprises:
obtaining a coordinate of a center of the second face and a coordinate of the center of the display; and
moving the center of the second face to the center of the display.

* * * * *